(12) United States Patent
Zhou et al.

(10) Patent No.: US 10,135,831 B2
(45) Date of Patent: Nov. 20, 2018

(54) SYSTEM AND METHOD FOR COMBINING AN ACCESS CONTROL SYSTEM WITH A TRAFFIC MANAGEMENT SYSTEM

(75) Inventors: Dennis Zhou, Fremont, CA (US); Amit Jain, Santa Clara, CA (US)

(73) Assignee: F5 Networks, Inc., Seattle, WA (US)

( * ) Notice: Subject to any disclaimer, the term of this patent is extended or adjusted under 35 U.S.C. 154(b) by 646 days.

(21) Appl. No.: 13/165,783

(22) Filed: Jun. 21, 2011

(65) Prior Publication Data

US 2012/0198512 A1 Aug. 2, 2012

Related U.S. Application Data

(60) Provisional application No. 61/437,063, filed on Jan. 28, 2011.

(51) Int. Cl.
*H04L 29/06* (2006.01)
*H04L 12/803* (2013.01)
*H04L 12/813* (2013.01)
*H04L 12/851* (2013.01)

(52) U.S. Cl.
CPC .......... *H04L 63/102* (2013.01); *H04L 47/122* (2013.01); *H04L 47/20* (2013.01); *H04L 47/2408* (2013.01); *H04L 63/0815* (2013.01)

(58) Field of Classification Search
CPC .................. H04L 63/0272; H04L 63/102; G06F 17/3089
USPC ...................................... 726/3, 12
See application file for complete search history.

(56) References Cited

U.S. PATENT DOCUMENTS

| 3,115,802 A | 12/1963 | Sweeny |
| 3,950,735 A | 4/1976 | Patel |
| 4,644,532 A | 2/1987 | George et al. |
| 4,897,781 A | 1/1990 | Chang et al. |

(Continued)

FOREIGN PATENT DOCUMENTS

| EP | 0 744 850 | 11/1996 |
| EP | 0744850 A2 | 11/1996 |

(Continued)

OTHER PUBLICATIONS

International Search Report and Opinion, PCT/US2012/022996, dated May 30, 2012.

(Continued)

*Primary Examiner* — Joseph P Hirl
*Assistant Examiner* — Hassan Saadoun
(74) *Attorney, Agent, or Firm* — LeClairRyan PLLC

(57) ABSTRACT

A system and method for handling a request from a client device to access a service from a server. The method comprises receiving a request from a user using a client device to access a service from a server. The request is received by a network traffic management device having a local external access management (EAM) agent. The EAM agent directly communicates with an EAM server that provides authentication policy information of a plurality of users able to at least partially access the server. User credential information is sent from the EAM agent to the EAM server, whereby the EAM agent receives access policy information of the user from the EAM server. The system and method selectively controls access of the user's request to the server in accordance with the received access policy information at the network traffic management device.

30 Claims, 10 Drawing Sheets

(56) References Cited

U.S. PATENT DOCUMENTS

| | | |
|---|---|---|
| 4,965,772 A | 10/1990 | Daniel et al. |
| 5,023,826 A | 6/1991 | Patel |
| 5,053,953 A | 10/1991 | Patel |
| 5,167,024 A | 11/1992 | Smith et al. |
| 5,299,312 A | 3/1994 | Rocco, Jr. |
| 5,327,529 A | 7/1994 | Fults et al. |
| 5,329,508 A | 7/1994 | Matsueda |
| 5,367,635 A | 11/1994 | Bauer et al. |
| 5,371,852 A | 12/1994 | Attanasio et al. |
| 5,388,237 A | 2/1995 | Sodos |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,742,765 A | 4/1998 | Wong et al. |
| 5,752,023 A | 5/1998 | Choucri et al. |
| 5,761,484 A | 6/1998 | Agarwal et al. |
| 5,761,534 A | 6/1998 | Lundberg et al. |
| 5,768,423 A | 6/1998 | Aref et al. |
| 5,774,660 A | 6/1998 | Brendel et al. |
| 5,790,554 A | 8/1998 | Pitcher et al. |
| 5,797,033 A | 8/1998 | Ecclesine |
| 5,802,052 A | 9/1998 | Venkataraman |
| 5,812,550 A | 9/1998 | Sohn et al. |
| 5,825,772 A | 10/1998 | Dobbins et al. |
| 5,828,835 A | 10/1998 | Isfeld et al. |
| 5,832,283 A | 11/1998 | Chou et al. |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 6,006,260 A | 12/1999 | Barrick, Jr. |
| 6,006,264 A | 12/1999 | Colby et al. |
| 6,026,443 A | 2/2000 | Oskouy et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,092,196 A | 7/2000 | Reiche |
| 6,108,703 A | 8/2000 | Leighton et al. |
| 6,111,876 A | 8/2000 | Frantz et al. |
| 6,115,802 A | 9/2000 | Tock et al. |
| 6,128,279 A | 10/2000 | O'Neil et al. |
| 6,128,657 A | 10/2000 | Okanoya et al. |
| 6,160,874 A | 12/2000 | Dickerman et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,263,368 B1 | 7/2001 | Martin |
| 6,289,012 B1 | 9/2001 | Harrington et al. |
| 6,298,380 B1 | 10/2001 | Coile et al. |
| 6,314,408 B1 | 11/2001 | Salas et al. |
| 6,327,622 B1 | 12/2001 | Jindal et al. |
| 6,343,324 B1 | 1/2002 | Hubis et al. |
| 6,347,339 B1 | 2/2002 | Morris et al. |
| 6,360,270 B1 | 3/2002 | Cherkasova et al. |
| 6,374,300 B2 | 4/2002 | Masters |
| 6,396,833 B1 | 5/2002 | Zhang et al. |
| 6,430,562 B1 | 8/2002 | Kardos et al. |
| 6,434,081 B1 | 8/2002 | Johnson et al. |
| 6,480,476 B1 | 11/2002 | Willars |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,519,643 B1 | 2/2003 | Foulkes et al. |
| 6,529,508 B1 | 3/2003 | Li et al. |
| 6,601,084 B1 | 7/2003 | Bhaskaran et al. |
| 6,614,957 B2 | 9/2003 | Wyeth et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Hatley |
| 6,661,802 B1 | 12/2003 | Homberg et al. |
| 6,683,873 B1 | 1/2004 | Kwok et al. |
| 6,691,165 B1 | 2/2004 | Bruck et al. |
| 6,694,517 B1 | 2/2004 | James et al. |
| 6,700,871 B1 | 3/2004 | Harper et al. |
| 6,708,187 B1 | 3/2004 | Shanumgam et al. |
| 6,718,380 B1 | 4/2004 | Mohaban et al. |
| 6,742,045 B1 | 5/2004 | Albert et al. |
| 6,748,457 B2 | 6/2004 | Fallon et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,781,990 B1 | 8/2004 | Puri et al. |
| 6,798,777 B1 | 9/2004 | Ferguson et al. |
| 6,804,542 B1 | 10/2004 | Haartsen |
| 6,816,901 B1 | 11/2004 | Sitaraman et al. |
| 6,816,977 B2 | 11/2004 | Brakmo et al. |
| 6,820,133 B1 | 11/2004 | Grove et al. |
| 6,826,698 B1 | 11/2004 | Minkin et al. |
| 6,829,238 B2 | 12/2004 | Tokuyo et al. |
| 6,868,082 B1 | 3/2005 | Allen, Jr. et al. |
| 6,876,629 B2 | 4/2005 | Beshai et al. |
| 6,876,654 B1 | 4/2005 | Hedge |
| 6,904,040 B2 | 4/2005 | Salapura et al. |
| 6,888,836 B1 | 5/2005 | Cherkasova |
| 6,928,082 B2 | 8/2005 | Liu et al. |
| 6,947,985 B2 | 9/2005 | Hegli et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,959,394 B1 | 10/2005 | Brickell et al. |
| 6,975,592 B1 | 12/2005 | Seddigh et al. |
| 6,986,040 B1 | 1/2006 | Kramer et al. |
| 6,987,763 B2 | 1/2006 | Rochberger et al. |
| 6,999,457 B2 | 2/2006 | Shinohara |
| 7,007,092 B2 | 2/2006 | Peiffer |
| 7,058,633 B1 | 6/2006 | Gnagy et al. |
| 7,065,630 B1 | 6/2006 | Ledebohm et al. |
| 7,107,348 B2 | 9/2006 | Shimada et al. |
| 7,113,993 B1 | 9/2006 | Cappiello et al. |
| 7,117,308 B1 | 10/2006 | Mitten et al. |
| 7,133,944 B2 | 11/2006 | Song et al. |
| 7,139,792 B1 | 11/2006 | Mishra et al. |
| 7,142,540 B2 | 11/2006 | Hendel et al. |
| 7,174,393 B2 | 2/2007 | Boucher et al. |
| 7,185,359 B2 | 2/2007 | Schmidt et al. |
| 7,228,422 B2 | 6/2007 | Morioka et al. |
| 7,236,491 B2 | 6/2007 | Tsao et al. |
| 7,272,150 B2 | 9/2007 | Bly et al. |
| 7,281,030 B1 | 10/2007 | Davis |
| 7,283,470 B1 | 10/2007 | Sindhu et al. |
| 7,295,827 B2 | 11/2007 | Liu et al. |
| 7,308,703 B2 | 12/2007 | Wright et al. |
| 7,308,709 B1 | 12/2007 | Brezak et al. |

(56) References Cited

U.S. PATENT DOCUMENTS

| | | | |
|---|---|---|---|
| 7,310,339 B1 | 12/2007 | Powers et al. |
| 7,319,696 B2 | 1/2008 | Inoue et al. |
| 7,321,926 B1 | 1/2008 | Zhang et al. |
| 7,324,525 B2 | 1/2008 | Fuhs et al. |
| 7,343,413 B2 | 3/2008 | Gilde et al. |
| 7,349,391 B2 | 3/2008 | Ben-Dor et al. |
| 7,353,326 B2 | 4/2008 | Cho et al. |
| 7,355,977 B1 | 4/2008 | Li |
| 7,415,034 B2 | 4/2008 | Muller et al. |
| 7,376,772 B2 | 5/2008 | Fallon |
| 7,383,570 B2 | 6/2008 | Pinkas et al. |
| 7,398,552 B2 | 7/2008 | Pardee et al. |
| 7,403,542 B1 | 7/2008 | Thompson |
| 7,411,957 B2 | 8/2008 | Stacy et al. |
| 7,420,931 B2 | 9/2008 | Nanda et al. |
| 7,433,962 B2 | 10/2008 | Janssen et al. |
| 7,437,478 B2 | 10/2008 | Yokota et al. |
| 7,454,480 B2 | 11/2008 | Labio et al. |
| 7,457,313 B2 | 11/2008 | Patrick |
| 7,333,999 B1 | 12/2008 | Njemanze |
| 7,475,122 B2 | 1/2009 | Azpitarte |
| 7,478,186 B1 | 1/2009 | Onufryk et al. |
| 7,490,162 B1 | 2/2009 | Masters |
| 7,496,689 B2 | 2/2009 | Sharp et al. |
| 7,496,695 B2 | 2/2009 | Go et al. |
| 7,500,028 B2 | 3/2009 | Yamagishi |
| 7,500,243 B2 | 3/2009 | Huetsch et al. |
| 7,500,269 B2 | 3/2009 | Huotari et al. |
| 7,505,795 B1 | 3/2009 | Lim et al. |
| 7,512,078 B2 | 3/2009 | Swain |
| 7,512,721 B1 | 3/2009 | Olson |
| 7,516,492 B1 | 4/2009 | Nisbet et al. |
| 7,522,581 B2 | 4/2009 | Acharya et al. |
| 7,526,541 B2 | 4/2009 | Roese et al. |
| 7,533,197 B2 | 5/2009 | Leonard et al. |
| 7,552,232 B2 | 6/2009 | Helmer, Jr. et al. |
| 7,558,197 B1 | 7/2009 | Sindhu et al. |
| 7,558,910 B2 | 7/2009 | Alverson et al. |
| 7,571,180 B2 | 8/2009 | Minyailov |
| 7,571,299 B2 | 8/2009 | Loeb |
| 7,580,971 B1 | 8/2009 | Gollapudi et al. |
| 7,590,732 B2 | 9/2009 | Rune |
| 7,590,753 B2 | 9/2009 | Wolde et al. |
| 7,620,046 B2 | 11/2009 | Ronciak et al. |
| 7,620,071 B2 | 11/2009 | Makineni et al. |
| 7,621,162 B2 | 11/2009 | Bartky |
| 7,624,424 B2 | 11/2009 | Morita et al. |
| 7,644,137 B2 | 1/2010 | Bozak et al. |
| 7,647,416 B2 | 1/2010 | Chiang et al. |
| 7,657,659 B1 | 2/2010 | Lambeth et al. |
| 7,660,916 B2 | 2/2010 | Moskalev et al. |
| 7,668,166 B1 | 2/2010 | Rekhter et al. |
| 7,668,727 B2 | 2/2010 | Mitchell et al. |
| 7,668,851 B2 | 2/2010 | Triplett |
| 7,689,710 B2 | 3/2010 | Tang et al. |
| 7,706,261 B2 | 4/2010 | Sun et al. |
| 7,710,989 B2 | 5/2010 | Chew |
| 7,724,657 B2 | 5/2010 | Rao et al. |
| 7,725,093 B2 | 5/2010 | Sengupta et al. |
| 7,729,239 B1 | 6/2010 | Aronov et al. |
| 7,734,809 B2 | 6/2010 | Joshi et al. |
| 7,735,099 B1 | 6/2010 | Micalizzi, Jr. |
| 7,742,412 B1 | 6/2010 | Medina |
| 7,778,187 B2 | 8/2010 | Chaturvedi et al. |
| 7,784,093 B2 | 8/2010 | Deng et al. |
| 7,808,913 B2 | 10/2010 | Ansari et al. |
| 7,813,277 B2 | 10/2010 | Okholm et al. |
| 7,826,487 B1 | 11/2010 | Mukerji et al. |
| 7,831,662 B2 | 11/2010 | Clark et al. |
| 7,840,841 B2 | 11/2010 | Huang et al. |
| 7,876,677 B2 | 1/2011 | Cheshire |
| 7,877,524 B1 | 1/2011 | Annem et al. |
| 7,908,314 B2 | 3/2011 | Yamaguchi et al. |
| 7,916,728 B1 | 3/2011 | Mimms |
| 7,925,908 B2 | 4/2011 | Kim |
| 7,930,365 B2 | 4/2011 | Dixit et al. |
| 7,933,496 B2 | 4/2011 | Livshits et al. |
| 7,936,772 B2 | 5/2011 | Kashyap |
| 7,945,908 B1 | 5/2011 | Waldspurger et al. |
| 7,984,141 B2 | 7/2011 | Gupta et al. |
| 7,991,918 B2 | 8/2011 | Uha et al. |
| 7,996,569 B2 | 8/2011 | Aloni et al. |
| 8,006,016 B2 | 8/2011 | Muller et al. |
| 8,041,022 B1 * | 10/2011 | Andreasen ........... G06Q 20/102 370/390 |
| 8,077,620 B2 | 12/2011 | Solomon et al. |
| 8,099,528 B2 | 1/2012 | Millet et al. |
| 8,103,781 B1 | 1/2012 | Wu et al. |
| 8,103,809 B1 | 1/2012 | Michels et al. |
| 8,112,491 B1 | 2/2012 | Michels et al. |
| 8,112,594 B2 | 2/2012 | Giacomoni et al. |
| 8,130,650 B2 | 3/2012 | Allen, Jr. et al. |
| 8,149,819 B2 | 4/2012 | Kobayashi et al. |
| 8,185,475 B2 | 5/2012 | Hug |
| 8,189,567 B2 | 5/2012 | Kavanagh et al. |
| 8,199,757 B2 | 6/2012 | Pani et al. |
| 8,205,246 B2 | 6/2012 | Shatzkamer et al. |
| 8,219,609 B1 | 7/2012 | Bhattacharjee et al. |
| 8,233,380 B2 | 7/2012 | Subramanian et al. |
| 8,239,954 B2 | 8/2012 | Wobber et al. |
| 8,274,895 B2 | 9/2012 | Rahman et al. |
| 8,279,865 B2 | 10/2012 | Giacomoni et al. |
| 8,302,169 B1 | 10/2012 | Presoto et al. |
| 8,306,036 B1 | 11/2012 | Bollay et al. |
| 8,321,908 B2 | 11/2012 | Gai et al. |
| 8,346,993 B2 | 1/2013 | Michels et al. |
| 8,351,333 B2 | 1/2013 | Rao et al. |
| 8,380,854 B2 | 2/2013 | Szabo |
| 8,417,817 B1 | 4/2013 | Jacobs |
| 8,447,871 B1 | 5/2013 | Szabo |
| 8,447,884 B1 | 5/2013 | Baumann |
| 8,447,970 B2 | 5/2013 | Klein et al. |
| 8,448,234 B2 | 5/2013 | Mondaeev et al. |
| 8,452,876 B1 | 5/2013 | Williams et al. |
| 8,464,265 B2 | 6/2013 | Worley |
| 8,468,247 B1 | 6/2013 | Richardson et al. |
| 8,468,267 B2 | 6/2013 | Yigang |
| 8,521,851 B1 | 8/2013 | Richardson et al. |
| 8,521,880 B1 | 8/2013 | Richardson et al. |
| 8,359,224 B2 | 9/2013 | Henderson et al. |
| 8,527,758 B2 | 9/2013 | Mansour |
| 8,566,474 B2 | 10/2013 | Kanode et al. |
| 8,578,050 B2 | 11/2013 | Craig et al. |
| 8,606,921 B2 | 12/2013 | Vasquez et al. |
| 8,615,022 B2 | 12/2013 | Harrison et al. |
| 8,646,067 B2 | 2/2014 | Agarwal et al. |
| 8,665,868 B2 | 3/2014 | Kay |
| 8,701,179 B1 | 4/2014 | Penno et al. |
| 8,725,836 B2 | 5/2014 | Lowery et al. |
| 8,726,338 B2 | 5/2014 | Narayanaswamy et al. |
| 8,737,304 B2 | 5/2014 | Karuturi et al. |
| 8,778,665 B2 | 7/2014 | Glide et al. |
| 8,799,403 B2 | 8/2014 | Chan et al. |
| 8,804,504 B1 | 8/2014 | Chen |
| 8,819,109 B1 | 8/2014 | Krishnamurthy et al. |
| 8,819,419 B2 | 8/2014 | Carlson et al. |
| 8,819,768 B1 | 8/2014 | Koeten et al. |
| 8,830,874 B2 | 9/2014 | Cho et al. |
| 8,848,715 B2 | 9/2014 | Izenberg et al. |
| 8,873,753 B2 | 10/2014 | Parker |
| 8,875,274 B2 | 10/2014 | Montemurro et al. |
| 8,880,632 B1 | 11/2014 | Michels et al. |
| 8,880,696 B1 | 11/2014 | Michels et al. |
| 8,886,981 B1 | 11/2014 | Baumann et al. |
| 8,908,545 B1 | 12/2014 | Chen et al. |
| 8,954,080 B2 | 2/2015 | Janakiraman et al. |
| 8,984,178 B2 | 3/2015 | Michels et al. |
| 9,032,113 B2 | 5/2015 | Conroy et al. |
| 9,036,529 B2 | 5/2015 | Erickson |
| 9,037,166 B2 | 5/2015 | de Wit et al. |
| 9,047,259 B1 | 6/2015 | Ho et al. |
| 9,077,554 B1 | 7/2015 | Szabo |
| 9,083,760 B1 | 7/2015 | Hughes et al. |
| 9,114,326 B2 | 8/2015 | Johnson et al. |

(56) References Cited

U.S. PATENT DOCUMENTS

| | | | |
|---|---|---|---|
| 9,172,753 B1 | 10/2015 | Jiang et al. | |
| 9,246,819 B1 | 1/2016 | Thirasuttakorn | |
| 9,505,712 B2 | 11/2016 | Van Den Tillaart et al. | |
| 9,589,114 B2 | 5/2017 | Strom et al. | |
| 9,709,805 B2 | 7/2017 | Weindorf et al. | |
| 9,745,800 B2 | 8/2017 | Poteet, III | |
| 9,905,829 B2 | 2/2018 | Masuda | |
| 9,906,913 B2 | 2/2018 | Ding et al. | |
| 9,910,858 B2 | 3/2018 | Fermum et al. | |
| 9,939,373 B2 | 4/2018 | Salemo et al. | |
| 9,964,967 B2 | 5/2018 | Zheng et al. | |
| 2001/0009554 A1 | 7/2001 | Katseff et al. | |
| 2001/0023442 A1 | 9/2001 | Masters | |
| 2002/0010783 A1 | 1/2002 | Primak et al. | |
| 2002/0032777 A1 | 3/2002 | Kawata et al. | |
| 2002/0046291 A1 | 4/2002 | O'Callaghan et al. | |
| 2002/0049842 A1 | 4/2002 | Huetsch et al. | |
| 2002/0059428 A1 | 5/2002 | Susai et al. | |
| 2002/0083067 A1 | 6/2002 | Tamayo et al. | |
| 2002/0095498 A1 | 7/2002 | Chanda et al. | |
| 2002/0112061 A1 | 8/2002 | Shih et al. | |
| 2002/0138615 A1 | 9/2002 | Schmelling | |
| 2002/0156927 A1 | 10/2002 | Boucher et al. | |
| 2002/0161913 A1 | 10/2002 | Gonzalez et al. | |
| 2002/0194342 A1 | 12/2002 | Lu et al. | |
| 2002/0198993 A1 | 12/2002 | Cudd et al. | |
| 2003/0037070 A1 | 2/2003 | Marston | |
| 2003/0046291 A1 | 3/2003 | Fascenda | |
| 2003/0065653 A1 | 4/2003 | Overton et al. | |
| 2003/0065951 A1 | 4/2003 | Igeta et al. | |
| 2003/0067930 A1 | 4/2003 | Salapura et al. | |
| 2003/0069918 A1 | 4/2003 | Lu et al. | |
| 2003/0069974 A1 | 4/2003 | Lu et al. | |
| 2003/0070069 A1* | 4/2003 | Belapurkar et al. | 713/155 |
| 2003/0086415 A1 | 5/2003 | Bernhard et al. | |
| 2003/0105807 A1 | 6/2003 | Thompson et al. | |
| 2003/0105983 A1 | 6/2003 | Brakmo et al. | |
| 2003/0108052 A1 | 6/2003 | Inoue et al. | |
| 2003/0120948 A1 | 6/2003 | Schmidt et al. | |
| 2003/0128708 A1 | 7/2003 | Inoue et al. | |
| 2003/0145062 A1 | 7/2003 | Sharma et al. | |
| 2003/0145233 A1 | 7/2003 | Poletto et al. | |
| 2003/0163576 A1 | 8/2003 | Janssen et al. | |
| 2003/0188193 A1 | 10/2003 | Vishwanath | |
| 2003/0204636 A1 | 10/2003 | Greenblat et al. | |
| 2003/0208596 A1 | 11/2003 | Carolan et al. | |
| 2003/0225485 A1 | 12/2003 | Fritz et al. | |
| 2004/0003287 A1 | 1/2004 | Zissimopoulos et al. | |
| 2004/0072569 A1 | 4/2004 | Omae et al. | |
| 2004/0103283 A1 | 5/2004 | Hornak | |
| 2004/0111523 A1 | 6/2004 | Hall et al. | |
| 2004/0111621 A1 | 6/2004 | Himberger et al. | |
| 2004/0117493 A1* | 6/2004 | Bazot et al. | 709/229 |
| 2004/0151186 A1 | 8/2004 | Akama | |
| 2004/0192312 A1 | 9/2004 | Li et al. | |
| 2004/0199762 A1 | 10/2004 | Carlson et al. | |
| 2004/0202161 A1 | 10/2004 | Stachura et al. | |
| 2004/0210663 A1 | 10/2004 | Phillips et al. | |
| 2004/0243808 A1 | 12/2004 | Ishiguro | |
| 2004/0249881 A1 | 12/2004 | Uha et al. | |
| 2004/0249948 A1 | 12/2004 | Sethi et al. | |
| 2004/0255000 A1 | 12/2004 | Simionescu et al. | |
| 2004/0264472 A1 | 12/2004 | Oliver et al. | |
| 2004/0264481 A1 | 12/2004 | Darling et al. | |
| 2004/0267897 A1 | 12/2004 | Hill et al. | |
| 2004/0267920 A1 | 12/2004 | Hydrie et al. | |
| 2004/0267948 A1 | 12/2004 | Oliver et al. | |
| 2004/0268358 A1 | 12/2004 | Darling et al. | |
| 2005/0004887 A1 | 1/2005 | Igakura et al. | |
| 2005/0005133 A1 | 1/2005 | Xia et al. | |
| 2005/0007991 A1 | 1/2005 | Ton et al. | |
| 2005/0021736 A1 | 1/2005 | Carusi et al. | |
| 2005/0027869 A1 | 2/2005 | Johnson | |
| 2005/0044213 A1 | 2/2005 | Kobayashi et al. | |
| 2005/0052440 A1 | 3/2005 | Kim et al. | |
| 2005/0055435 A1 | 3/2005 | Gbadegesin et al. | |
| 2005/0071283 A1 | 3/2005 | Randle et al. | |
| 2005/0078604 A1 | 4/2005 | Yim | |
| 2005/0083952 A1 | 4/2005 | Swain | |
| 2005/0114559 A1 | 5/2005 | Miller | |
| 2005/0122942 A1 | 6/2005 | Rhee et al. | |
| 2005/0122977 A1 | 6/2005 | Lieberman | |
| 2005/0154837 A1 | 7/2005 | Keohane et al. | |
| 2005/0175014 A1 | 8/2005 | Patrick | |
| 2005/0187866 A1 | 8/2005 | Lee | |
| 2005/0188220 A1 | 8/2005 | Nilsson et al. | |
| 2005/0198310 A1 | 9/2005 | Kim et al. | |
| 2005/0213570 A1 | 9/2005 | Stacy et al. | |
| 2005/0262238 A1* | 11/2005 | Reeves et al. | 709/224 |
| 2005/0288939 A1 | 12/2005 | Peled et al. | |
| 2006/0007928 A1 | 1/2006 | Sangillo | |
| 2006/0031520 A1 | 2/2006 | Bedekar et al. | |
| 2006/0036764 A1 | 2/2006 | Yokota et al. | |
| 2006/0059267 A1 | 3/2006 | Cugi et al. | |
| 2006/0067349 A1 | 3/2006 | Ronciak et al. | |
| 2006/0077902 A1 | 4/2006 | Kannan et al. | |
| 2006/0077986 A1 | 4/2006 | Rune | |
| 2006/0083205 A1 | 4/2006 | Buddhikot et al. | |
| 2006/0095573 A1 | 5/2006 | Carle et al. | |
| 2006/0104303 A1 | 5/2006 | Makineni et al. | |
| 2006/0106802 A1 | 5/2006 | Giblin et al. | |
| 2006/0112176 A1 | 5/2006 | Liu et al. | |
| 2006/0112272 A1 | 5/2006 | Morioka et al. | |
| 2006/0129684 A1 | 6/2006 | Datta | |
| 2006/0135198 A1 | 6/2006 | Lee | |
| 2006/0156416 A1 | 7/2006 | Huotari et al. | |
| 2006/0161577 A1 | 7/2006 | Kulkarni et al. | |
| 2006/0168070 A1 | 7/2006 | Thompson et al. | |
| 2006/0171365 A1 | 8/2006 | Borella | |
| 2006/0179153 A1 | 8/2006 | Lee et al. | |
| 2006/0182103 A1 | 8/2006 | Martini et al. | |
| 2006/0184647 A1 | 8/2006 | Dixit et al. | |
| 2006/0209853 A1 | 9/2006 | Hidaka et al. | |
| 2006/0221832 A1 | 10/2006 | Muller et al. | |
| 2006/0221835 A1 | 10/2006 | Sweeney | |
| 2006/0230148 A1 | 10/2006 | Forecast et al. | |
| 2006/0233106 A1 | 10/2006 | Achlioptas et al. | |
| 2006/0235996 A1 | 10/2006 | Wolde et al. | |
| 2006/0242300 A1 | 10/2006 | Yumoto et al. | |
| 2006/0253583 A1 | 11/2006 | Dixon | |
| 2006/0268704 A1 | 11/2006 | Ansari et al. | |
| 2006/0288128 A1 | 12/2006 | Moskalev et al. | |
| 2006/0291483 A1 | 12/2006 | Sela | |
| 2006/0294054 A1 | 12/2006 | Kudo et al. | |
| 2007/0006293 A1 | 1/2007 | Balakrishnan et al. | |
| 2007/0016662 A1 | 1/2007 | Desai et al. | |
| 2007/0019658 A1 | 1/2007 | Park et al. | |
| 2007/0297410 A1 | 2/2007 | Yoon et al. | |
| 2007/0050843 A1 | 3/2007 | Manville et al. | |
| 2007/0058670 A1 | 3/2007 | Konduru et al. | |
| 2007/0064661 A1 | 3/2007 | Sood et al. | |
| 2007/0083646 A1 | 4/2007 | Miller et al. | |
| 2007/0087756 A1 | 4/2007 | Hoffberg | |
| 2007/0088822 A1 | 4/2007 | Coile et al. | |
| 2007/0106796 A1 | 5/2007 | Kudo et al. | |
| 2007/0107048 A1 | 5/2007 | Halls et al. | |
| 2007/0118879 A1 | 5/2007 | Yeun | |
| 2007/0174491 A1 | 7/2007 | Still et al. | |
| 2007/0219917 A1 | 9/2007 | Liu et al. | |
| 2007/0220598 A1 | 9/2007 | Salowey et al. | |
| 2007/0233809 A1 | 10/2007 | Brownell et al. | |
| 2007/0258451 A1 | 11/2007 | Bouat | |
| 2007/0297551 A1 | 12/2007 | Choi | |
| 2008/0008202 A1 | 1/2008 | Terrell et al. | |
| 2008/0010207 A1 | 1/2008 | Yanagihara et al. | |
| 2008/0025297 A1 | 1/2008 | Kashyap | |
| 2008/0031258 A1 | 2/2008 | Acharya et al. | |
| 2008/0034136 A1 | 2/2008 | Ulenas | |
| 2008/0059797 A1 | 3/2008 | Tokuno et al. | |
| 2008/0072303 A1 | 3/2008 | Syed | |
| 2008/0101596 A1 | 5/2008 | Cerruti et al. | |
| 2008/0120370 A1 | 5/2008 | Chan et al. | |
| 2008/0126509 A1 | 5/2008 | Subramanian et al. | |
| 2008/0133518 A1 | 6/2008 | Kapoor et al. | |

(56) References Cited

U.S. PATENT DOCUMENTS

| | | |
|---|---|---|
| 2008/0134311 A1 | 6/2008 | Medvinsky et al. |
| 2008/0148340 A1 | 6/2008 | Powell et al. |
| 2008/0159145 A1 | 7/2008 | Muthukrishnan et al. |
| 2008/0165801 A1 | 7/2008 | Sheppard |
| 2008/0177994 A1 | 7/2008 | Mayer |
| 2008/0178278 A1 | 7/2008 | Grinstein et al. |
| 2008/0184248 A1 | 7/2008 | Barua et al. |
| 2008/0201599 A1 | 8/2008 | Ferraiolo et al. |
| 2008/0205613 A1 | 8/2008 | Lopez |
| 2008/0219279 A1 | 9/2008 | Chew |
| 2008/0222646 A1 | 9/2008 | Sigal et al. |
| 2008/0225710 A1 | 9/2008 | Raja et al. |
| 2008/0229415 A1 | 9/2008 | Kapoor et al. |
| 2008/0235508 A1 | 9/2008 | Ran et al. |
| 2008/0239986 A1 | 10/2008 | Xu et al. |
| 2008/0253395 A1 | 10/2008 | Pandya |
| 2008/0256224 A1 | 10/2008 | Kaji et al. |
| 2008/0279200 A1 | 11/2008 | Shatzkamer et al. |
| 2008/0282354 A1 | 11/2008 | Wobber et al. |
| 2008/0288661 A1 | 11/2008 | Galles |
| 2008/0301760 A1 | 12/2008 | Lim |
| 2008/0316922 A1 | 12/2008 | Riddle et al. |
| 2009/0003204 A1 | 1/2009 | Okholm et al. |
| 2009/0016217 A1 | 1/2009 | Kashyap |
| 2009/0028337 A1 | 1/2009 | Balabine et al. |
| 2009/0049230 A1 | 2/2009 | Pandya |
| 2009/0070617 A1 | 3/2009 | Arimilli et al. |
| 2009/0077619 A1 | 3/2009 | Boyce |
| 2009/0089619 A1 | 4/2009 | Huang et al. |
| 2009/0094610 A1 | 4/2009 | Sukirya |
| 2009/0119504 A1 | 5/2009 | van Os et al. |
| 2009/0125496 A1 | 5/2009 | Wexler et al. |
| 2009/0125532 A1 | 5/2009 | Wexler et al. |
| 2009/0125625 A1 | 5/2009 | Shim et al. |
| 2009/0138749 A1 | 5/2009 | Moll et al. |
| 2009/0141891 A1 | 6/2009 | Boyen et al. |
| 2009/0157678 A1 | 6/2009 | Turk |
| 2009/0193126 A1 | 7/2009 | Agarwal et al. |
| 2009/0193513 A1 | 7/2009 | Agarwal et al. |
| 2009/0196282 A1 | 8/2009 | Fellman et al. |
| 2009/0222598 A1 | 9/2009 | Hayden |
| 2009/0228956 A1 | 9/2009 | He et al. |
| 2009/0248893 A1 | 10/2009 | Richardson et al. |
| 2009/0248911 A1 | 10/2009 | Conroy et al. |
| 2009/0287935 A1 | 11/2009 | Aull et al. |
| 2009/0296624 A1 | 12/2009 | Ryu et al. |
| 2009/0300407 A1 | 12/2009 | Kamath et al. |
| 2010/0011434 A1 | 1/2010 | Kay |
| 2010/0017846 A1 | 1/2010 | Huang et al. |
| 2010/0071048 A1 | 3/2010 | Novak et al. |
| 2010/0082849 A1 | 4/2010 | Millet et al. |
| 2010/0094945 A1 | 4/2010 | Chan et al. |
| 2010/0115236 A1 | 5/2010 | Bataineh et al. |
| 2010/0122091 A1 | 5/2010 | Huang et al. |
| 2010/0017627 A1 | 6/2010 | Princen et al. |
| 2010/0150154 A1 | 6/2010 | Viger et al. |
| 2010/0154031 A1 | 6/2010 | Montemurro et al. |
| 2010/0191974 A1 | 6/2010 | Dubhashi et al. |
| 2010/0165877 A1 | 7/2010 | Shukla et al. |
| 2010/0188976 A1 | 7/2010 | Rahman et al. |
| 2010/0189052 A1* | 7/2010 | Kavanagh ......... H04L 29/12915 370/329 |
| 2010/0242092 A1* | 9/2010 | Harris et al. .................. 726/3 |
| 2010/0251330 A1 | 9/2010 | Kroeselberg et al. |
| 2010/0279733 A1 | 11/2010 | Karsten et al. |
| 2010/0299451 A1 | 11/2010 | Yigang et al. |
| 2010/0322250 A1 | 12/2010 | Shetty et al. |
| 2010/0325277 A1 | 12/2010 | Muthiah et al. |
| 2011/0040889 A1* | 2/2011 | Garrett et al. ................ 709/232 |
| 2011/0047620 A1 | 2/2011 | Mahaffey et al. |
| 2011/0087888 A1 | 4/2011 | Rennie |
| 2011/0090541 A1 | 4/2011 | Harper |
| 2011/0107077 A1 | 5/2011 | Henderson et al. |
| 2011/0153822 A1 | 6/2011 | Rajan et al. |
| 2011/0154443 A1 | 6/2011 | Thakur et al. |
| 2011/0173295 A1 | 7/2011 | Bakke et al. |
| 2011/0184733 A1 | 7/2011 | Yu et al. |
| 2011/0197059 A1 | 8/2011 | Klein et al. |
| 2011/0202676 A1 | 8/2011 | Craig et al. |
| 2011/0246800 A1 | 10/2011 | Accpadi et al. |
| 2011/0273984 A1 | 11/2011 | Hsu et al. |
| 2011/0277016 A1* | 11/2011 | Hockings ............... G06F 21/41 726/4 |
| 2011/0282997 A1 | 11/2011 | Prince et al. |
| 2011/0314178 A1 | 12/2011 | Kanode et al. |
| 2011/0321122 A1 | 12/2011 | Mwangi et al. |
| 2012/0016994 A1 | 1/2012 | Nakamura et al. |
| 2012/0030341 A1 | 2/2012 | Jensen et al. |
| 2012/0039341 A1 | 2/2012 | Latif et al. |
| 2012/0041965 A1 | 2/2012 | Vasquez et al. |
| 2012/0063314 A1 | 3/2012 | Pignataro et al. |
| 2012/0066489 A1 | 3/2012 | Ozaki et al. |
| 2012/0079055 A1 | 3/2012 | Robinson |
| 2012/0101952 A1 | 4/2012 | Raleigh et al. |
| 2012/0124372 A1 | 5/2012 | Dilley et al. |
| 2012/0191800 A1 | 7/2012 | Michels et al. |
| 2012/0191847 A1 | 7/2012 | Nas et al. |
| 2012/0198043 A1 | 8/2012 | Hesketh et al. |
| 2012/0224531 A1 | 9/2012 | Karuturi et al. |
| 2012/0311153 A1 | 12/2012 | Morgan |
| 2012/0317266 A1 | 12/2012 | Abbott |
| 2013/0003106 A1 | 1/2013 | Lowery et al. |
| 2013/0029726 A1 | 1/2013 | Berionne et al. |
| 2013/0031060 A1 | 1/2013 | Lowery et al. |
| 2013/0054433 A1 | 2/2013 | Giard |
| 2013/0055367 A1 | 2/2013 | Kshirsagar |
| 2013/0067546 A1 | 3/2013 | Thavasi |
| 2013/0091002 A1 | 4/2013 | Christie et al. |
| 2013/0163758 A1 | 6/2013 | Swaminathan et al. |
| 2013/0198322 A1 | 8/2013 | Oran et al. |
| 2013/0205361 A1 | 8/2013 | Narayanaswamy et al. |
| 2013/0262873 A1 | 10/2013 | Read |
| 2013/0282589 A1 | 10/2013 | Shoup |
| 2013/0336122 A1 | 12/2013 | Baruah et al. |
| 2014/0032695 A1 | 1/2014 | Michels et al. |
| 2014/0040478 A1 | 2/2014 | Hsu et al. |
| 2014/0059678 A1 | 2/2014 | Parker |
| 2014/0095661 A1 | 4/2014 | Knowles et al. |
| 2014/0162705 A1 | 6/2014 | de Wit et al. |
| 2014/0171089 A1 | 6/2014 | Janakiraman et al. |
| 2014/0185422 A1 | 7/2014 | Newman et al. |
| 2014/0250535 A1 | 9/2014 | Qu et al. |
| 2014/0269484 A1 | 9/2014 | Dankberg et al. |
| 2014/0301207 A1 | 10/2014 | Durand et al. |
| 2014/0317404 A1 | 10/2014 | Carlson et al. |

FOREIGN PATENT DOCUMENTS

| | | |
|---|---|---|
| EP | 1813084 | 8/2007 |
| WO | 9114326 | 9/1991 |
| WO | 9505712 | 2/1995 |
| WO | 9905829 | 2/1997 |
| WO | 9709805 | 3/1997 |
| WO | 9745800 | 12/1997 |
| WO | 9906913 | 2/1999 |
| WO | 9910858 | 3/1999 |
| WO | 9939373 | 8/1999 |
| WO | 9964967 | 12/1999 |
| WO | 0004422 | 1/2000 |
| WO | 0004458 | 1/2000 |
| WO | WO 00/04422 | 1/2000 |
| WO | WO 00/04458 | 1/2000 |
| WO | WO 2004/079930 | 9/2004 |
| WO | WO 2006/055494 | 5/2006 |
| WO | WO 2007/040858 | 4/2007 |
| WO | WO 2009/158680 | 12/2009 |

OTHER PUBLICATIONS

Crescendo Networks, "Application Layer Processing (ALP)," 2003-2009, pp. 168-186, Chapter 9, CN-5000E/5500E, Foxit Software Company.

(56) References Cited

OTHER PUBLICATIONS

F5 Networks, Inc., "BIG-IP Controller with Exclusive OneConnect Content Switching Feature Provides a Breakthrough System for Maximizing Server and Network Performance," Press Release, May 8, 2001, 2 pages, Las Vegas, Nevada.
Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.
OWASP, "Testing for Cross site scripting", OWASP Testing Guide v2, Table of Contents, Feb. 24, 2011, pp. 1-5, (www.owasp.org/index.php/Testing_for_Cross_site_scripting).
International Search Report for International Patent Application No. PCT/US2013/026615 (dated Jul. 4, 2013).
U.S. Appl. No. 13/164,672 to Nat Thirasuttakorn, filed Jun. 20, 2011.
U.S. Appl. No. 13/234,042 to Baumann et al., filed Sep. 15, 2011.
U.S. Appl. No. 13/234,047 to Wojcik et al., filed Sep. 15, 2011.
U.S. Appl. No. 12/822,146 to Jeff Costlow, filed Jun. 23, 2010.
U.S. Appl. No. 13/235,276 to Hawthorne et al., filed Sep. 16, 2011.
U.S. Appl. No. 13/234,031 to Baumann et al., filed Sep. 15, 2011.
U.S. Appl. No. 13/400,398 to Jiang et al., filed Feb. 20, 2012.
International Search Report and the Written Opinion, for International Patent Application No. PCT/US2011/058469, dated Mar. 10, 2015.
"A Process for Selective Routing of Servlet Content to Transcoding Modules," Research Disclosure 422124, Jun. 1999, pp. 889-890, IBM Corporation.
"Chapter 15, Memory Mapping and DMA," Memory Management in Linux, ch15.13676, accessed on Jan. 25, 2005, pp. 412-463.
"Plan 9 kernel history: overview/file list/diff list," http://switch.com/cgi-bin/plan9history.cgi?f=2001/0126/pc/etherga620.com, accessed Oct. 22, 2007, pp. 1-16.
"Servlet/Applet/HTML Authentication Process With Single Sign-On," Research Disclosure 429128, Jan. 2000, pp. 163-164, IBM Corporation.
"Traffic Surges; Surge Queue; Netscaler Defense," 2005, PowerPoint Presentation, slides 1-12, Citrix Systems, Inc.
Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.
Alteon Websystems Inc., "Gigabit Ethernet/PCI Network Interface Card; Host/NIC Software Interface Definition," Jul. 1999, pp. 1-80, Revision Dec. 4, 2013, P/N 020001, San Jose, California.
Bell Laboratories Lucent Technologies, "Layer 4/7 Switching and Other Custom IP Traffic Processing using the NEPPI API," Bell Laboratories, Lucent Technologies, pp. 1-11, Murray Hill, NJ.
Cavium Networks, "Cavium Networks Product Selector Guide—Single & Multi-Core MIPS Processors, Security Processors and Accelerator Boards," 2008, pp. 1-44, Mountain View, CA, US.
Cavium Networks, "NITROX™ XL Security Acceleration Modules PCI 3V or 3V/5V-Universal Boards for SSL and IPSec," at http://www.Caviumnetworks.com, 2002, p. 1, Mountain View, CA USA.
Cavium Networks, "PCI, PCI-X" at (http://www.cavium.com/acceleration_boards_PCI_PCI-X.htm (Downloaded Oct. 2008), Cavium Networks—Products>Acceleration Boards>PCI,PCI-X).
Chong et al, "Two-Factor Face Authentication: Topographic Independent Component Analysis (TICA) and Multispace Random Projection (MRP)", International Conference of Soft Computing and Pattern Recognition, 2009, http://ieeexplore.ieee.org/stamp/stamp.jsp?arnumber=5368670.
Comtech AHA Corporation, "Comtech Aha Announces 3.0 Gbps GZIP Compression/Decompression Accelerator AHA362-PCIX offers high-speed GZIP compression and decompression," www.aha.com, Apr. 20, 2005, pp. 1-2, Moscow, ID, USA.
Comtech AHA Corporation, "Comtech AHA Announces GZIP Compression/Decompression IC offers the highest-speed and compression ration performance in hardware on the market," www.aha.com, Jun. 26, 2007, pp. 1-2, Moscow, ID, USA.
Crescendo Networks, "Application Layer Processing (ALP)", 2003-2009, pp. 168-186, Chapter 9, CN-5000E/5500E, Foxit Software Company.
EventHelix, "DMA and Interrupt Handling," http://eventhelix.com/RealtimeMantra/FaultHandling/dma_interrupt_handling.htm, Jan. 29, 2010, pp. 1-4, EventHelix.com.
EventHelix, "TCP—Transmission Control Protocol (TCP Fast Retransmit and Recovery)," Mar. 28, 2002, pp. 105, EventHelix.com.
F5 Networks Inc., "BIG-IP® Access Policy Manager® Application Access Guide," Aug. 17, 2011, pp. 1-24, Version 11.0, F5 Networks, Inc.
F5 Networks Inc., "BIG-IP® Access Policy Manager® Network Access Configuration Guide," Nov. 15, 2011, pp. 1-58, Version 11.1, F5 Networks, Inc.
F5 Networks Inc., "BIG-IP® Access Policy Manager® Portal Access Guide," Nov. 15, 2011, pp. 1-38, Version 11.1, F5 Networks, Inc.
F5 Networks Inc., "BIG-IP® Access Policy Manager® Single Sign-On Configuration Guide," Nov. 15, 2011, pp. 1-38, Version 11.1, F5 Networks, Inc.
F5 Networks Inc., "BIG-IP® Access Policy Manager®, Authentication Configuration Guide," Nov. 15, 2011, pp. 1-68, Version 11.1, F5 Networks, Inc.
F5 Networks Inc., "Configuration Guide for BIG-IP® Access Policy Manager®", Oct. 14, 2013, pp. 1-436, Version 11.1, F5 Networks, Inc.
F5 Networks Inc., "Configuration Guide for Local Traffic Management," F5 Networks Inc., Jan. 2006, version 9.2.2, 406 pgs.
F5 Networks, Inc., "BIP-IP Controller with Exclusive OneConnect Content Switching Feature Provides a Breakthrough System for Maximizing Server and Network Performance," Press Release, May 8, 2001, 2 ages, Las Vegas, Nevada.
F5 Networks, Inc., "SOL11199: Creating a High Availability LDAP Authentication Configuration," pp. 1-3, retrieved from http://support.f5.com/kb/en-us/solutions/public/11000/100/sol11199.print.html on Feb. 27, 2014.
Fielding et al., "Hypertext Transfer Protocol—HTTP/1.1," Network Working Group, RFC: 2068, Jan. 1997, pp. 1-162.
Fielding et al., "Hypertext Transfer Protocol—HTTP/1.1," Network Working Group, RFC: 2616, Jun. 1999, pp. 1-176.
Floyd et al., "Random Early Detection Gateways for Congestion Avoidance," Aug. 1993, pp. 1-22, IEEE/ACM Transactions on Networking, California.
Harvey et al., "DMA Fundamentals on Various PC Platforms," Application Note 011, Apr. 1991, pp. 1-20, National Instruments Corporation.
Hazelwood et al., "Improved Grid Security Posture through Multi-factor Authentication", 12th IEEE/ACM International Conference on Grid Computing (GRID), 2011, http://ieeexplore.ieee.org/stamp/stamp.jsp?arnumber=6076505.
Hochmuth, Phil, "F5, CacheFlow pump up content-delivery lines," Network World Fusion, May 4, 2001, 1 page, Las Vegas, Nevada.
International Search Report and Written Opinion, for PCT/US2011/058469 (dated May 30, 2012) 10 pages.
International Search Report and Written Opinion for PCT/US2012/022996 (dated May 30, 2012) 12 pages.
International Search Report and Written Opinion for PCT/US2013/026615 (dated Jul. 4, 2013) 10 pages.
Macvittie, Lori, "Message-Based Load Balancing," Technical Brief, Jan. 2010, pp. 1-9, F5 Networks, Inc.
Mangino, John, "Using DMA with High Performance Peripherals to Maximize System Performance," WW TMS470 Catalog Applications, SPNA105 Jan. 2007, pp. 1-23.
Mogul, Jeffrey C., "The Case for Persistent-Connection HTTP," SIGCOMM '95, Digital Equipment Corporation Western Research Laboratory, 1995, pp. 1-15, Cambridge, Maine.
Mohammed et al., "A Multi-Level of Multi Factors Authentication Model for Online Banking Services," 2013 International Conference on Computing, Electrical and Electronics Engineering (ICCEEE), http://ieeexplore.ieee.org/stamp/stamp.jsp?arnumber=56633936.
Owasp, "Testing for Cross Site Scripting", Owasp Testing Guide v2, Table of Contents, Feb. 24, 2011, pp. 1-5, (www.owasp.org/index.php/Testing_for_Cross_site)scripting).

(56) References Cited

OTHER PUBLICATIONS

Rabinovich et al., "DHTTP: An Efficient and Cache-Friendly Transfer Protocol for the Web," IEEE/ACM Transactions on Networking, Dec. 2004, pp. 107-1020, vol. 12, No. 6.
Salchow, Jr., KJ, "Clustered Multiprocessing: Changing the Rules of the Performance Game," F5 White Paper, Jan. 2008, pp. 1-11, F5 Networks, Inc.
Stevens, W., "TCP Slow Start, Congestion Avoidance, Fast Retransmit, and Fast Recovery Algorithms," Network Working Group, RFC 2001, Jan. 1997, pp. 1-6.
Traore et al., "Combining Mouse and Keystroke Dynamics Biometrics for Risk-Based/Authentication in Web Environments", 2012 Fourth International Conference on Digital Home (ICDH), http://ieeexplore.ieee.org/stamp/stamp.jsp?arnumber=6376399.
Wadge, Wallace, "Achieving Gigabit Performance on Programmable Ethernet Network Interface Cards," May 29, 2001, pp. 1-9.
Welch, Von, "A User's Guide to TCP Windows," http://www.vonwelch.com/reports/tcp_windows, updated 1996, last accessed Jan. 29, 2010, pp. 1-5.
Wikipedia, "Direct memory access," http://en.wikipedia.org/wiki/Direct_memory_access, accessed Jan. 29, 2010, pp. 1-6.
Wikipedia, "Nagle's algorithm," http://en.wikipedia.org/wiki/Nagle%27s_algorithm>, 2 pages.
Bell Laboratories, "Layer 4/7 Switching and Other Custom IP Traffic Processing Using the NEPPI API," Bell Laboratones, Lucent Technologies, Murray Hill, NJ 07974 USA, pp. 1-11 (2000).
Wikipedia, "Nagle's algorithm," https://en.wikipedia.org/wiki/Nagle%27s_algoiithm 2 Pages. Dec. 14, 2014.

\* cited by examiner

SYSTEM AND METHOD FOR COMBINING AN ACCESS CONTROL SYSTEM WITH A TRAFFIC MANAGEMENT SYSTEM

STATEMENT OF RELATED APPLICATION

The present application claims the benefit of priority based on U.S. Provisional Patent Application Ser. No. 61/437,063, filed on Jan. 28, 2011, in the names of Dennis Zhou and Amit Jain, entitled "Systems and Method for Combining an Access Control System with a Traffic Management System", all commonly owned herewith.

TECHNOLOGICAL FIELD

This technology generally relates to network communication security, and more particularly, to a system and method for enforcing a dynamic access policy via external access management technology.

BACKGROUND

Existing computer network systems utilize an access management system to control the access to various applications and documents. These systems include various components such as an enterprise access management (EAM) system which may store policy information. The policy information describes various security settings for applications and documents protected by the EAM system. The security settings may include authorization attributes for various users who are allowed to access the secured applications. The EAM system securely maintains and implements authentication, authorization and audit (AAA) procedures for each user in conformance with established policy configurations to ensure that only approved services from within the secured domain are provided to users who meet or have the appropriate security clearance.

In particular, existing computer network systems are set up such that requests from users are received by the application servers themselves in the secured network. The application server may contain a software-based access management server agent (EAM agent) which allows the application server to directly communicate with the EAM server, which then conducts the AAA procedure. In one instance of this deployment, for each access request sent from the user, the EAM agent of the application server will communicate the user's information to the EAM server. The EAM server will then evaluate the access policy associated with the application that the user is trying to access and will return the result of the evaluation to the application server. Based on the received result from the EAM server, the application server may allow or deny the user access to the application.

In common deployment, the EAM systems and traffic management systems are two different disparate systems and are not aware of each other. Due to load balancing and traffic handling parameters, a computer network system which contains several application servers in the secured network domain requires each application server to have an EAM agent to allow the application servers to effectively communicate with the EAM server(s). This is burdensome and expensive to administer; raises challenges with regard to interoperability and scalability; and lacks security.

What is needed is a network traffic management device that is configured to implement an EAM agent which allows the network traffic management device to communicate with the EAM server to receive policy information and have AAA functionality while effectively performing traffic management operations.

Figure 1:
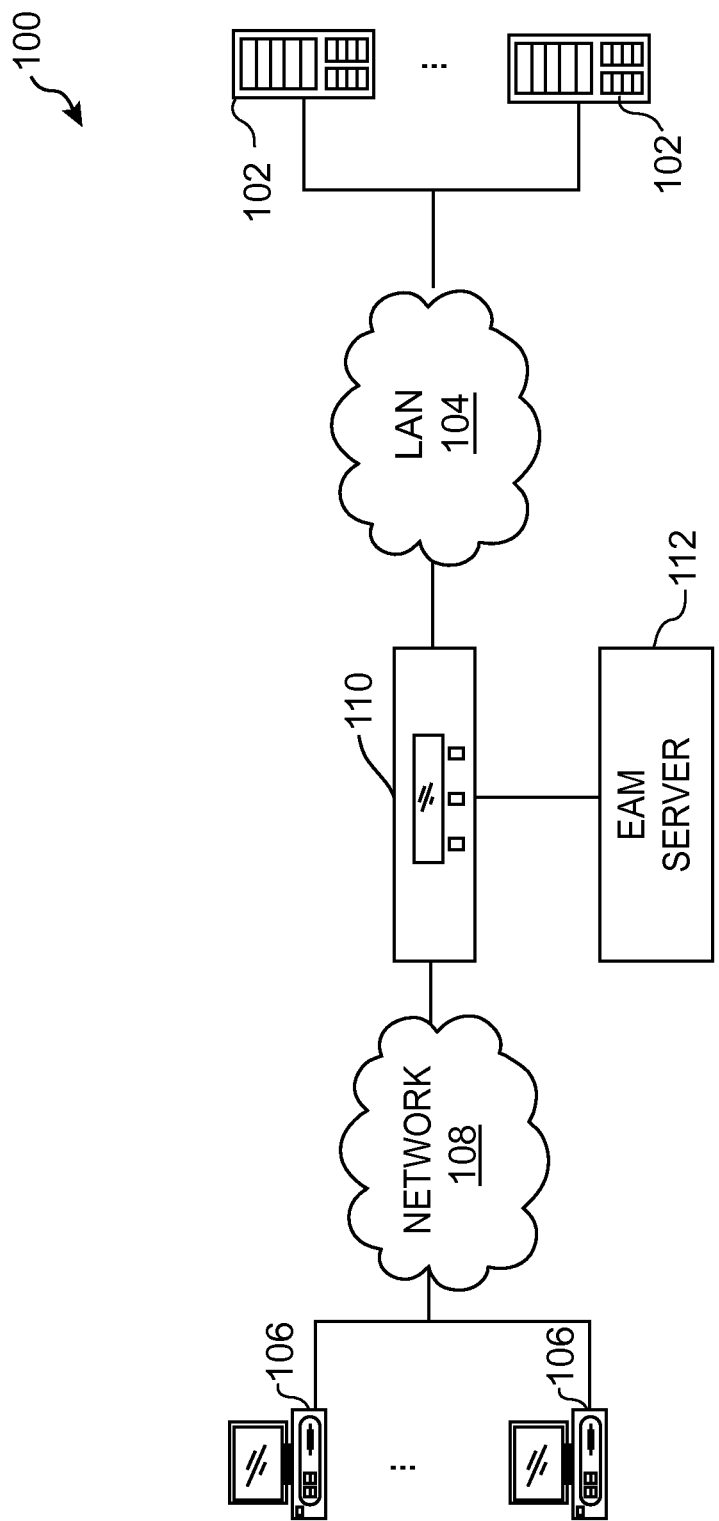
FIG. 1 is a diagram of an example system environment that includes a network traffic manager in accordance with an aspect of the present disclosure.

While these examples are susceptible of embodiments in many different forms, there is shown in the drawings and will herein be described in detail preferred examples with the understanding that the present disclosure is to be considered as an exemplification and is not intended to limit the broad aspect to the embodiments illustrated.

SUMMARY

In an aspect, a method for handling a request from a client device to access a service from a server. The method comprises receiving a request from a user using a client device to access a service from a server. The request is received by a network traffic management device having a local external access management (EAM) agent. The EAM agent directly communicates with an EAM server that provides authentication policy information of a plurality of users able to at least partially access the server. User credential information is sent from the EAM agent to the EAM server, whereby the EAM agent receives access policy information of the user from the EAM server, which includes authorization and authentication information. The system and method selectively controls access of the user's request to the server in accordance with the received access policy information at the network traffic management device.

In an aspect, a non-transitory machine readable medium having stored thereon instructions for handling a request from a client device to access a service from a server, comprising machine executable code which when executed by at least one machine. The code causes the machine to receive a request from a user using a client device to access a service from a server. The machine, utilizing the machine readable medium, is configured to directly communicate with an EAM server that is configured to provide authentication policy information of a plurality of users able to at least partially access the server. The code causes the machine to send the user credential information to the EAM server and receive access policy information of the user from the EAM server. The code causes the machine to selectively control access of the user's request to the server to receive the requested resource in accordance with the received access policy information.

In an aspect, a network traffic management device for handling a request from a client device to access a service in a secured network. The network traffic management device comprises a network interface configured to receive and transmit network data packets over one or more networks and a memory storing one or more programming instructions and a local external access management (EAM) agent configured to directly communicate with an external access management (EAM) server. The network traffic management device includes a processor configured to execute the stored programming instructions and the EAM agent. The programming instructions when executed by the processor result in actions being performed that include receiving a request from a user using a client device to access a service from a server and sending, via the EAM agent, the user credential information to the EAM server. The processor capable of receiving, at EAM agent, access policy information of the user from the EAM server; and selectively controlling access of the user's request to the server to receive the requested resource in accordance with the received access policy.

DETAILED DESCRIPTION

FIG. 1 is a diagram of an example system environment that improves network performance in accordance with an aspect of the present disclosure. As shown in FIG. 1, the example system environment 100 employs a plurality of network devices such as one or more network traffic management devices 110, one or more servers 102 and one or more client devices 106. It should be noted, however, that the environment 100 could include other numbers and types of network devices in other arrangements. Within the present disclosure, if a network device is referred to in the singular (e.g. client device, network traffic management device, server), it should be noted that the more than one of that network device may be contemplated. Similarly, if a network device is referred to in the plurality (e.g. client devices, network traffic management devices, servers), it should be noted that a single network device may be contemplated.

Client devices 106 comprise network computing devices capable of sending requests to and receiving responses from other network computing devices, such as the network traffic management device 110 and/or the servers 102. Such connections are performed over wired and/or wireless networks, such as network 108, to send and receive the data. Non-limiting and non-exhausting examples of such client devices 106 include personal computers (e.g., desktops, laptops), tablet computers, smart televisions, video game consoles, mobile and/or smart phones and the like.

In an example, client devices 106 run Web browsers that may provide an interface for operators, such as human users, to interact with and for making requests for resources to different web server-based applications or Web pages via the network 108, although other server resources may be requested by clients. One or more Web-based and/or non Web-based applications may run on one or more servers 102 that provide the requested data back to one or more external network devices, such as client devices 106 and/or network traffic management device 110. It should be noted that while only two client devices 106 are shown in the environment 100 depicted in FIG. 1, other numbers and types of client devices are contemplated.

The one or more servers 102 shown in FIG. 1 comprise one or more server computing machines capable of operating one or more Web-based and/or non Web-based applications that may be accessed by other network devices in the network 108. Such servers 102 may provide data representing requested resources, such as particular Web page(s), image(s) of physical objects, and any other objects responsive to the requests. It should be noted that the servers 102 may perform other tasks and provide other types of resources. It is to be understood that the one or more servers 102 may be hardware and/or software, and/or may represent a system with multiple servers that may include internal or external networks. In this example, the servers 102 may be any version of Microsoft® IIS servers, and/or Apache® servers, although other types of servers may be used. In an aspect, one or more servers 102 utilize software to allow it run the RADIUS protocol (Remote Access Dial In User Services) to provide (AAA) services for users using dial-up PPP/IP, remotely-logged in users and/or users using Mobile IP access to access the secured network. It should be noted that while only two servers 102 are shown in the environment 100 depicted in FIG. 1, other numbers and types of servers are contemplated. It is also contemplated that one or more of the servers 102 may be a cluster of servers managed by one or more network traffic management devices 110.

Network 108 comprises a publicly accessible network, such as the Internet, which in essence utilizes one or more communication methods by which data may travel between client devices 106, servers 102, network traffic management devices 110, and the like. However, it is contemplated that the network 108 may comprise other types of private and public networks that include other devices. Communications, such as requests from client devices 106 and responses from servers 102, 112, take place over the network 108 according to standard network protocols, such as the HTTP, UDP, DNS and TCP/IP protocols in this example. However, the principles discussed herein are not limited to this example and can include other protocols. Further, it should be appreciated that the network 108 may include local area networks (LANs), wide area networks (WANs), direct connections and any combination thereof, as well as other types and numbers of network types.

LAN 104 comprises a private local area network that allows one or more network traffic management devices 110 to communicate with one or more servers 102 behind a secured network. In an aspect, the LAN 104 may comprise an interconnected set of LANs or other networks which enable messages and other data to be sent between the servers 102 and/or between the servers 102 and the one or more network traffic management devices 110. Although not shown, the LAN 104 may be comprised of differing architectures and protocols, that include one or more routers, switches, hubs, gateways, bridges, and other intermediate network devices may act as links within and between LANs and other networks. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (IS-DNs), Digital Subscriber Lines (DSLs), wireless links including satellite links and other communications links known to those skilled in the relevant arts.

Regarding the network protocols, the protocols are configured to establish and maintain connections between network devices as well as allow data to be sent and received for existing connections, and the like. In particular to an aspect, requests are sent from one or more client devices 106 over the network 108 using the TCP/IP protocol, whereby the requests are configured to access services from one or more endpoint devices, such as server 102. Similarly, responses are sent from one or more servers 102 over the network 108 using the TCP/IP protocol, whereby the responses provide the requested service to the client device 106. It should be noted that other protocols are contemplated, including, but not limited to, HTTP, UDP, and/or DNS protocols.

As shown in FIG. 1, the environment includes one or more network devices (e.g. server 112) which contains and manages defined access/identity management services. In FIG. 1, one or more external access management (EAM) servers 112 contain access policy information for individuals able to access the servers 102 in the secured network. The access policy information includes information regarding the user's identity, authentication and authorization information of the user, policy parameters for the user, as well as other information that can be used to identify the user as well as his/her access rights to services provided by the servers 102. The EAM servers 112 communicate with the network traffic management device 110 to control access to the resources in the secured network in which the network traffic management device 110 enforces restrictions on the established identities of the individuals based on defined access policy information provided by the EAM server 112. The EAM server 112 may be configured to store and modify defined user information relating to the AAA process as well as administered policy parameters for each user requesting resources from servers 102 in the secured network via LAN 104. The EAM server 112 can be configured to provide user-based identity management and access control services to the network traffic management device which enforces authentication, policy-based authorizations, and auditing with identity administration functionality such as delegated administration and workflows. In an aspect, EAM services are handled by third party providers such as Oracle™ Access Manager, CA Siteminder™ and the like.

As shown in the example environment 100 depicted in FIG. 1, one or more network traffic management devices 110 are interposed and allows communications between client devices 106 via network 108 and the one or more secured servers 102 via LAN 104. Again, the environment 100 could be arranged in other manners with other numbers and types of devices. Also, the network traffic management device 110 is coupled to network 108 by one or more network communication links and intermediate network devices (e.g. routers, switches, gateways, hubs and the like) (not shown). It should be understood that the devices and the particular configuration shown in FIG. 1 are provided for exemplary purposes only and thus are not limiting.

Generally, the network traffic management device 110 manages network communications, which include client requests and server responses via the network 108 and the LAN 104. Moreover, in an aspect shown in FIG. 1, the network traffic management device 110 communicates with the External Access Manager (EAM) server or software component 112 which allows the network traffic management 110 to enforce and manage the defined access policies based on each user request, as will be discussed in more detail below.

Generally, requests and other traffic sent over the network 108 from a user via a client device 106 to access one or more resources from one or more servers 102 in the secured network. These requests are received and handled by the network traffic management device 110 prior to being sent to the destination server 102. In determining whether the requesting user is authorized to access the resource from the server 102, the network traffic management device 110 communicates with one or more EAM servers 112 via an EAM agent 210. As stated above, the EAM server 112 communicates AAA procedures and implement user-specific policy parameters, in conformance with the implemented policy plan for the network, to the network traffic management device 110 in accordance with the processes described further below in accordance with aspects of the present disclosure.

Figure 2:
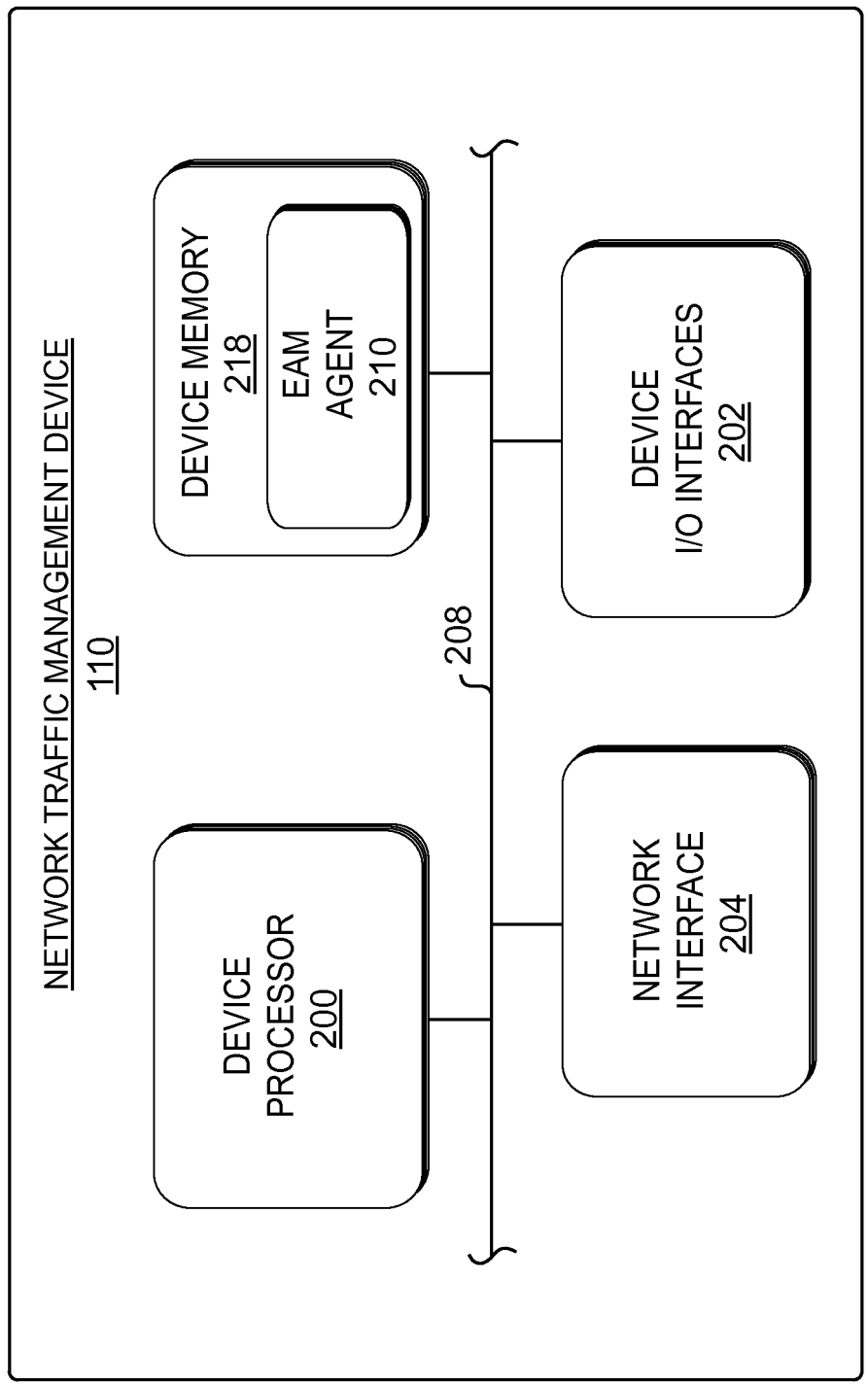
FIG. 2 is a block diagram of the network traffic manager shown in FIG. 1 in accordance with an aspect of the present disclosure.

Although an example of the Web application server 102, network traffic device 110, EAM server 112 and client devices 106 are described and illustrated herein in connection with FIGS. 1 and 2, each of the computers of the system 100 could be implemented on any suitable computer system or computing device. It is to be understood that the example devices and systems of the system 100 are for exemplary purposes, as many variations of the specific hardware and software used to implement the system 100 are possible, as will be appreciated by those skilled in the relevant art(s).

FIG. 2 is a block diagram of an example network traffic management device shown in FIG. 1 in accordance with an aspect of the present disclosure. As shown in FIG. 2, the example network traffic management device 110 includes one or more device processors 200, one or more device I/O interfaces 202, one or more network interfaces 204, one or more device memories 218, and one or more software-based EAM agent modules 210, all of which are coupled together via bus 208. It should be noted that the device 110 could include other types and numbers of components.

Device processor 200 comprises one or more microprocessors configured to execute computer/machine readable and executable instructions stored in device memory 218, and in particular the EAM agent module 210. Such instructions implement network traffic management related functions of the network traffic management device 110. In addition, the processor 200, upon executing the software instructions of the EAM agent module 210, will perform one or more portions of the processes described below in accordance with an aspect of the present disclosure.

Device I/O interfaces 202 comprise one or more user input and output device interface mechanisms. The interface may include a computer keyboard, mouse, touch screen, display device, and the corresponding physical ports and underlying supporting hardware and software to enable the network traffic management device 110 to communicate with the outside environment. Such communications may include accepting user data input and to provide user output, although other types and numbers of user input and output devices may be used. Additionally or alternatively, as will be described in connection with network interface 204 below, the network traffic management device 110 may communicate with the outside environment for certain types of operations (e.g., configuration) via a network management port.

Network interface 204 comprises one or more mechanisms that enable network traffic management device 110 to engage in network communications using one or more network protocols (e.g. HTTP) over LAN 104 and network 108. However, it is contemplated that the network interface 204 may be constructed for use with other communication protocols and types of networks. Network interface 204 is sometimes referred to as a transceiver, transceiving device, or network interface card (NIC), which transmits and receives network data packets to one or more networks, such as LAN 104 and network 108. In an example where the network traffic management device 110 includes more than one device processor 200 (or a processor 200 has more than one core), wherein each processor 200 (and/or core) may use the same single network interface 204 or a plurality of network interfaces 204. Further, the network interface 204 may include one or more physical ports, such as Ethernet ports, to couple the network traffic management device 110 with other network devices, such as servers 102. Moreover, the interface 204 may include certain physical ports dedicated to receiving and/or transmitting certain types of network data, such as device management related data for configuring the network traffic management device 110.

Bus 208 may comprise one or more internal device component communication buses, links, bridges and supporting components, such as bus controllers and/or arbiters. The bus enable the various components of the network traffic management device 110, such as the processor 200, device I/O interfaces 202, network interface 204, EAM agent module 210 and device memory 218, to communicate with one another. However, it is contemplated that the bus may enable one or more components of the network traffic management device 110 to communicate with components in other devices as well. Example buses include Hyper-Transport, PCI, PCI Express, InfiniBand, USB, Firewire, Serial ATA (SATA), SCSI, IDE and AGP buses. However, it is contemplated that other types and numbers of buses may be used, whereby the particular types and arrangement of buses will depend on the particular configuration of the network traffic management device 110.

Device memory 218 comprises non-transitory computer readable media, namely computer readable or processor readable storage media, which are examples of machine-readable storage media. Computer readable storage/machine-readable storage media may include volatile, nonvolatile, removable, and non-removable media implemented in any method or technology for storage of information. Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the desired information. Such desired information includes data and/or computer/machine-executable instructions and which can be accessed by one or more processors 200 of the network traffic management device 110.

Such storage media contains computer readable/machine-executable instructions, data structures, program modules, or other data, which may be obtained and/or executed by one or more processors, such as device processor 200. Such instructions allow the processor to perform actions, including implementing an operating system for controlling the general operation of network traffic management device 110 to manage network traffic and execute the instructions of the EAM agent module 210 in relation to the processes described in accordance with the present disclosure.

It is contemplated that the device memory 218 and EAM agent module 210 allow the storing and selective retrieval of information relating to the AAA process and/or user-specific policy parameters received from the EAM server 112. For instance, the device memory 218 may store identity based user ID based pool selection information and/or identity based service or policy information, as will be discussed in more detail below.

The network traffic management device 110, and in particular the software based EAM agent module 210, is configured to communicate with the EAM server 112, wherein the EAM server 112 provides the network traffic management device 110 with one or more AAA services in response to a user's request, sent from the client device 106, for a requested application and/or service from one or more servers 102 in the secured network.

As stated above, existing computer network architectures are configured such that the servers 102 themselves contain the EAM agent module. In these existing systems, the servers 102 themselves handle the user's requests at the application layer, whereby the server's 102 EAM agent module or a farm of EAM agent proxies will directly communicate with the EAM server 112 and have it perform the AAA services and enforce authorization and other policy parameters.

In contrast to the existing technology, the network traffic management device 110 of the present disclosure includes the EAM agent module 210 which allows the network traffic management device 110 to communicate with the EAM server 112 to have it perform the AAA services. The EAM server 112 provides the authorization and other policy parameter information to the network traffic management device 110, whereby the network traffic management device 110 dynamically enforces the access management policies based on the user's request prior to allowing the request to proceed to the servers 102. In effect, the policy enforcement point is shifted to the network traffic management device 110 in which the access policies, managed and defined by the EAM server 112, are dynamically enforced by the network traffic management device 110.

By allowing the network traffic management device 110 to enforce the access policies, EAM agents which were typically deployed among several servers 102, are centralized in the network traffic management device 110, thereby consolidating the proxy layer onto the network infrastructure. Other realized advantages of centralizing the enforcement of access policies on the network traffic management device 110 include, but are not limited to, allowing endpoint inspections, allowing scalability and high availability of requested services from the secured network, implementing web application security and acceleration (e.g. load balancing handled by the network traffic management device 110), and the like. It should be noted that although the EAM agent module 210 is depicted in FIG. 2 as being within memory 218 for exemplary purposes only; it should be appreciated the EAM agent module 210 may be alternatively located elsewhere in the network traffic management device 110.

Figure 3:
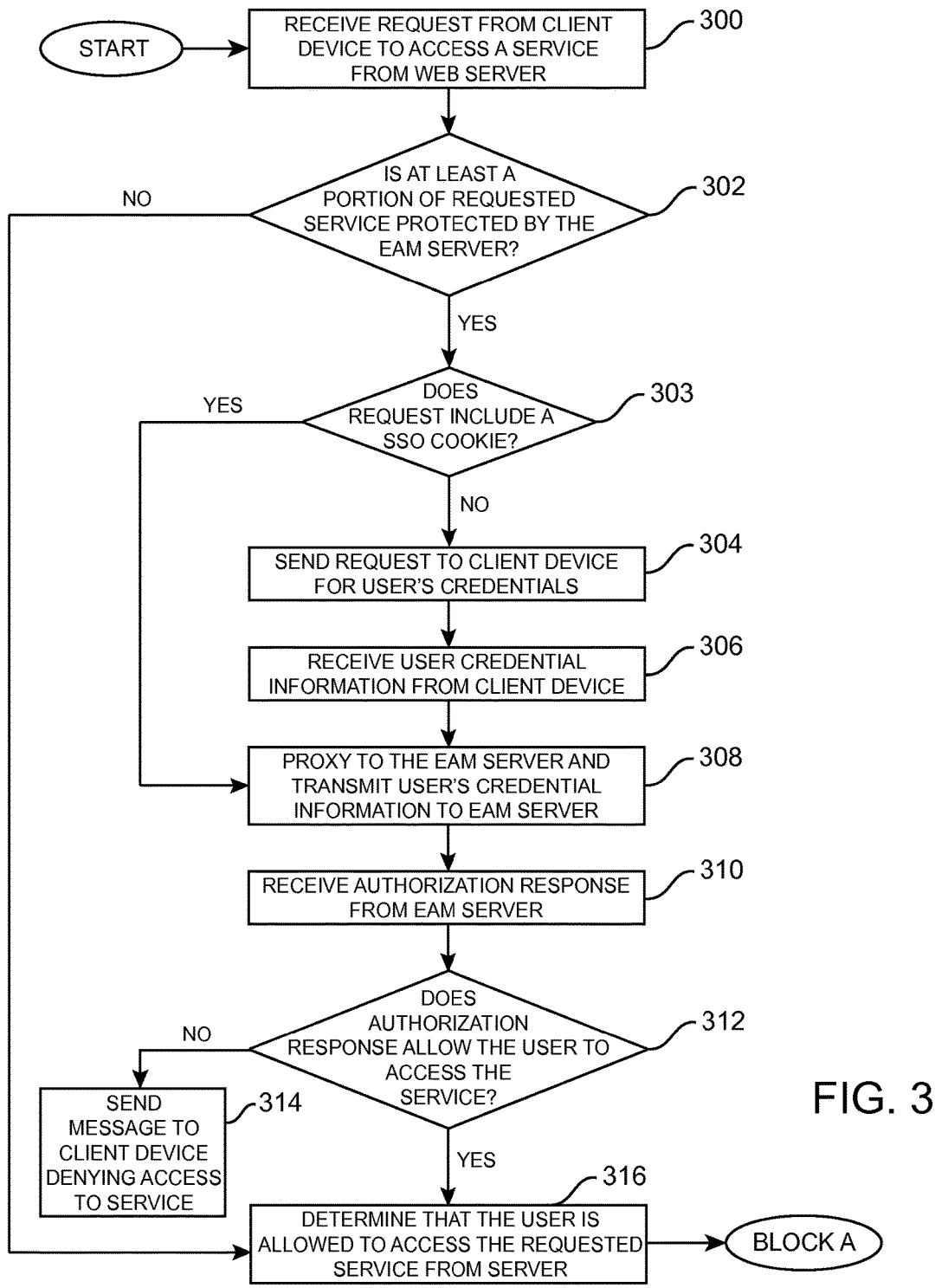
FIG. 3 is an example flow chart diagram depicting portions of processes for enforcing dynamic access policy via external access management technology in accordance with an aspect of the present disclosure.

FIG. 3 is an example flow chart diagram depicting portions of processes for enforcing dynamic access policy via external access management technology in accordance with an aspect of the present disclosure. As shown in FIG. 3, the process begins at the Start Block. As shown in FIG. 3, the network traffic management device 110 receives a request sent from a user, via a client device 106, wherein the request is an attempt to access a secured service or resource from one or more servers 102 (Block 300). In an aspect, the network traffic management device 110, upon receiving the request from the client device 106, determines whether the request is to access a service/resource that is considered protected by the EAM system as a defined access policy parameter (Block 302). In an aspect, the network traffic management device 110 may access an internal and/or external memory or cache or may communicate with the EAM server 112 via the EAM agent module 210 to determine whether the requested service/resource is considered protected in accordance with the defined access policy parameter. If the requested service/resource is not considered protected, the network traffic management device 110 will forward the request to the appropriate server 102 (Block 316), whereby the process proceeds to Block A.

In contrast, if it is determined that at least a portion of the requested service/resource is considered protected per the access policy parameters, the network traffic management device 110 may be configured to detect whether an SSO token or cookie is present in the request sent from the client device 106 (Block 303). If an SSO token is detected by the network traffic management device 110, the network traffic management device 110 will proxy the SSO token and transmit the user's credentials to the EAM server 112 (Block 308).

Referring back to Block 303, if the request from the client device 106 does not include an SSO token, the network traffic management device 110 will send a request back to the client device 106 asking for the user's credentials (Block 304). Upon receiving the user's credentials from the client device 106 (Block 306), the network traffic management device 110 will transmit that user's credentials to the EAM server 112 (Block 308).

The EAM server 112 will retrieve access and other policy information for the user, based on the user's credentials provided by the network traffic management device 110, and provide that information to the network traffic management device 110 (Block 310). Upon receiving the access policy information from the EAM server 112, the EAM agent 210 of the network traffic management device 110 will process the policy information and determine whether the policy information allows the user to access the requested service (Block 312). In other words, the network traffic management device 112 enforces the policy information for the user based on the user's actual request.

If the EAM agent 210 of the network traffic management device 110 determines that the user is allowed to access the requested service (Block 316), the process proceeds to Block A. In contrast, if the EAM agent 210 determines that the user is not allowed to access the requested service, the network traffic management device 110 will forward a message to the user's client device 106 informing the user that access to the requested service has been denied (Block 314).

Figure 4:
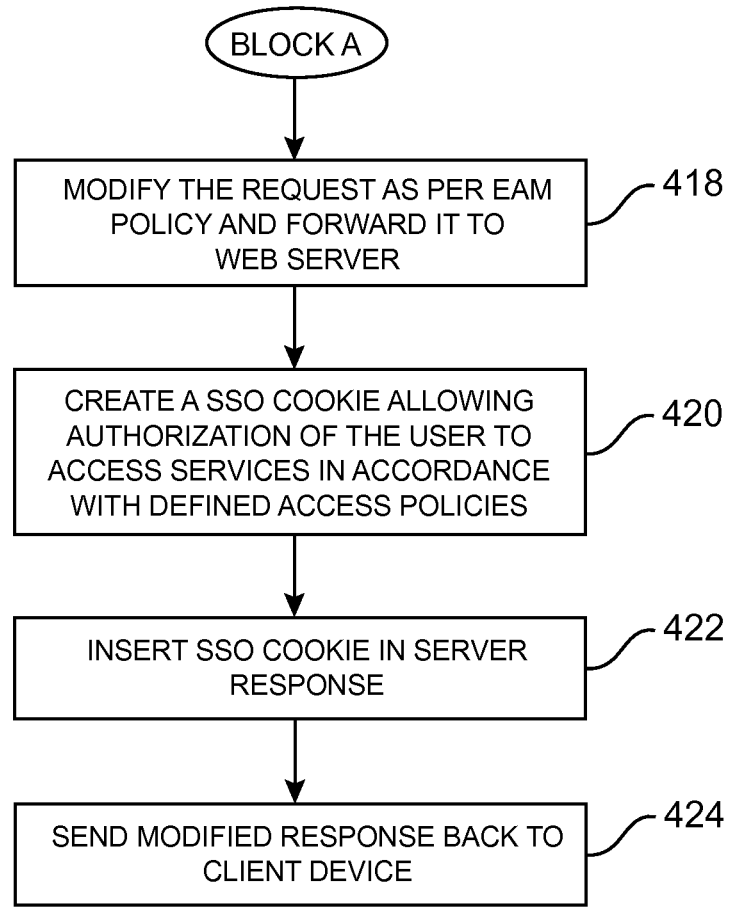
FIG. 4 is an example flow chart diagram depicting additional process steps to the general process disclosed in FIGS. 3 and/or 7 in accordance with an aspect of the present disclosure.

FIG. 4 is an example flow chart diagram depicting additional process steps to the general process in accordance with an aspect of the present disclosure. It should be noted that the steps discussed in FIG. 4 are optional and are not required to be performed by the network traffic management device 110. As illustrated in FIG. 3, after the network traffic management device 110 concludes that the user can access the requested resource/service from the appropriate server 102, the process proceeds to Block A. Thereafter, as shown in the example in FIG. 4, the network traffic management device 110 may be configured to modify the user's request, such as modifying the request header and/or the payload data, in accordance with policy parameters provided by the EAM server 112, whereby the network traffic management device 110 then forwards the modified request to the appropriate server 102 (Block 418).

As shown in FIG. 4, the network traffic management device 110 also creates a SSO token that contains access policy parameter information for the user in accordance with defined access policies received from the EAM server (Block 420). The access policy parameter information is stored in a cache or memory in the network traffic management device 110 after it has been received from the EAM server 112. Upon the network traffic management device 110 receiving the response from the server 102, the network traffic management device 110 inserts the SSO token into the response to modify the response (Block 422). It should be noted that other parts of the response, such as the response header and payload, can be modified in addition to the insertion of the SSO token, as governed by the EAM policies. The network traffic management device 110 then sends the modified response back to the client device (Block 424). The client device 106 will then store the SSO token in its local memory, whereby all subsequent requests from the user's client device 106 will include the SSO token. This SSO token will allow the user to subsequently access the requested service from the server for the set amount of time and/or for the rest of the session.

Figure 5:
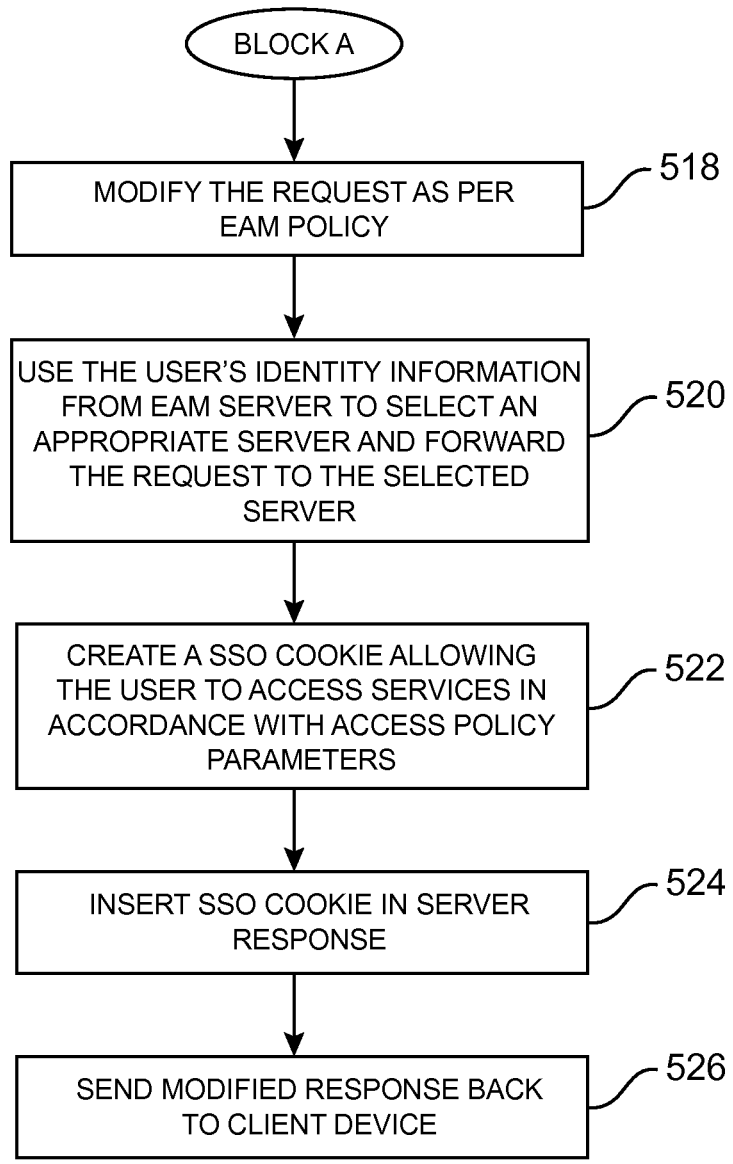
FIG. 5 is an example flow chart diagram depicting additional process steps to the general process disclosed in FIGS. 3 and/or 7 in accordance with an aspect of the present disclosure.

FIG. 5 is an example flow chart diagram depicting additional process steps to the general process in accordance with an aspect of the present disclosure. It should be noted that the steps discussed in FIG. 5 are optional and are not required to be performed by the network traffic management device 110. As discussed in relation to FIG. 3, after the network traffic management device 110 concludes that the user can access the requested resource/service from the appropriate server 102, the process proceeds to Block A. As shown in FIG. 5, the process continues from Block A, whereby the network traffic management device 110 is configured to modify the client device's request in accordance with access policy parameters provided by the EAM server 112 (Block 518).

In an aspect, the user's identity information can indicate traffic handling priority information for the user, whereby the network traffic management device 110 may use the user's identity information along with other policy information received from EAM server 112 to perform additional traffic handling and priority functionalities including, but not limited to, bandwidth management, acceleration performance, quality of service adjustment, selecting an appropriate server 102 where the request is to be sent and the like. (Block 520). Other traffic management functionalities may include, but not limited to, doing bandwidth management based on the user's identity, content acceleration, prioritized processing, providing different quality of service, and/or selecting a specific network segment. For example, the access policy information received from the EAM server 112 may indicate that the user is a VIP user, whereby the request is sent to a selected server having higher bandwidth, quicker processing capabilities, and the like.

As shown in FIG. 5, the network traffic management device 110 will also create a SSO token that contains access policy parameter information for the user (Block 522). Upon the network traffic management device 110 receiving the response from the server 102, the network traffic management device 110, in an aspect, inserts the SSO token into the response to modify the response (Block 524). It is contemplated that the network traffic management device 110 may additionally or alternatively modify the request header and/or payload data, as governed by the EAM policy information. The network traffic management device 110 then sends the modified response back to the client device (Block 526). The client device 106 will then store the SSO token in its local memory, whereby all subsequent requests from the user will include the SSO token which will allow the user to subsequently access the requested service from the server for the set amount of time and/or for the rest of the session.

Figure 6:
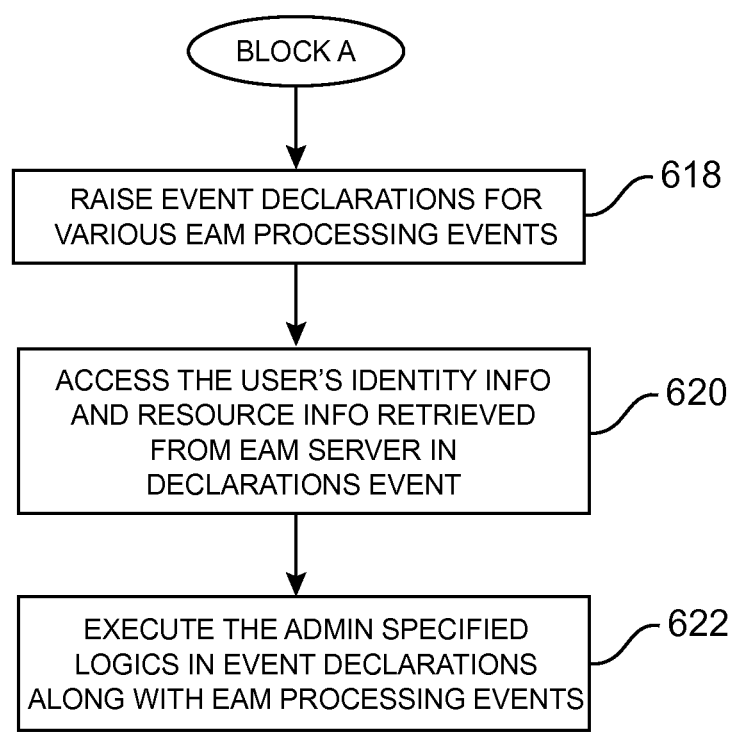
FIG. 6 is an example flow chart diagram depicting additional process steps to the general process disclosed in FIGS. 3 and/or 7 in accordance with an aspect of the present disclosure.

FIG. 6 is an example flow chart diagram depicting additional process steps to the general process in accordance with an aspect of the present disclosure. It should be noted that the steps discussed in FIG. 6 are optional and are not required to be performed by the network traffic management device 110. As discussed in relation to FIG. 3, after the network traffic management device 110 concludes that the user can access the requested resource/service from the appropriate server 102, the process proceeds to Block A. In an aspect, the network traffic management device 110 is able to execute request processing events that allow a network administrator to insert custom processing logic to modify the default request processing. In an instance, the custom processing logic can be written in tool command language code that is executed when that particular event occurs. In an example, a request processing event called RESOURCE_PROTECTED may be raised when it is found the requested resource is protected. Similarly, a request processing event ACCESS_ALLOWED can be raised when it is found that the user is authorized to access the requested service. In contrast, a request processing event ACCESS_DENIED can be raised when it is found that the user is not authorized to access the requested service. The network administrator can provide custom processing logic to be executed when these events are raised. For example, in one instance, the network administrator can provide custom processing to modify request headers for the requests which are authorized in an ACCESS_ALLOWED event. In another instance, the network administrator can access user's identity information in the ACCESS_ALLOWED event which then selects a specific server 102 to forward the request to. This results in the combination of the network administrator's custom traffic management policy and the user's identity. Thereafter, in accordance with the process in FIG. 6, the network traffic management device 110 allows a network administrator to use the user's identity information retrieved from EAM server 112 to establish and execute the event declarations (Block 620). Thereafter, the network traffic management device 110 executes the administrator's instructions along with the processing events (Block 622).

Figure 7:
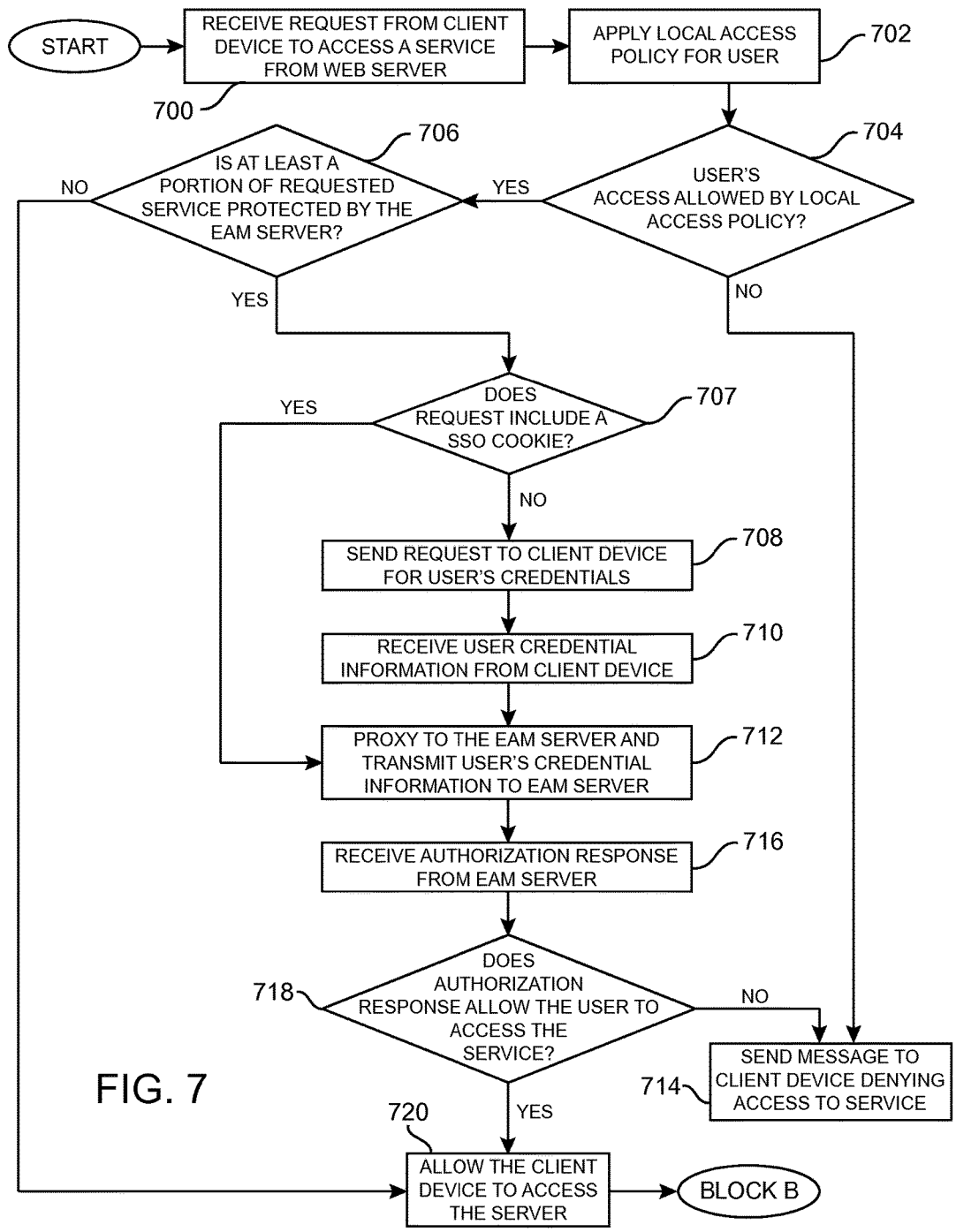
FIG. 7 is an example flow chart diagram depicting portions of processes for enforcing dynamic access policy via external access management technology in accordance with an aspect of the present disclosure.

FIG. 7 is an example flow chart diagram depicting portions of processes for enforcing dynamic access policy via external access management technology in accordance with an aspect of the present disclosure. As shown in FIG. 7, the network traffic management device 110 intercepts a user's request via a client device 106, wherein the request is an attempt to access a secured service/resource from one or more servers 102 (Block 700). In accordance with the process in FIG. 7, the network traffic management device 110 is configured to retrieve access policy information for the user from a local memory 218 (Block 702). In an aspect, the locally stored access policy information may include additional security checks like end point inspection, additional two factor authentications or other enhanced security checks (for example geo location based access control). In an aspect, the locally stored access policy information may have been previously provided by the EAM server 112. In an aspect, the access policy information may be directly stored in the local memory of the network traffic management device 110 by an administrator, whereby the network traffic management device 110 does not need to communicate with an EAM server to receive the access policy information. In an aspect the combined result of local access policy and EAM policy may determine the final outcome of request processing.

The network traffic management device 110 compares the user's authorization information with the retrieved policy information to determine whether the user is authorized to access the requested service (Block 704). If the network traffic management device 110 determines that the user's request is not authorized, the network traffic management device 110 will deny the user's request by sending a message to the user's client device 106 (Block 714).

In contrast, if the network traffic management device 110 determines that the user is authorized to access the requested service, the network traffic management device 110 may determine whether the request from the client device 106 is to access information which is considered protected by the EAM server 112 (Block 706). In an aspect, the network traffic management device 110 may access an internal and/or external memory or cache or may communicate with the EAM server 112 to determine whether the service/information is protected. If the requested service/information is not considered protected, the network traffic management device 110 will forward the request to the appropriate server 102 (Block 720), whereby the process proceeds to Block B.

If the network traffic management device 110 determines that at least a portion of the requested service/information is protected by the access policy parameters, the network traffic management device 110 will determine if the request contains an SSO cookie or token. If so, the network traffic management device 110 will proxy the EAM server 112 and transmit the SSO cookie or token to the EAM server 112 (Block 712).

However, if the network traffic management device 110 determines that the request does not contain an SSO cookie or token, the network traffic management device 110 will sends a request back to the client device 106 asking for the user's credentials (Block 708). Upon receiving the user's credentials (Block 710), the network traffic management device 110 will proxy the EAM server 112 and transmit that user's credentials to the EAM server 112 (Block 712).

Thereafter, the network traffic management device 110 receives a response from the EAM server 112 (Block 716). The network traffic management device 110 thereafter processes the access policy information received from the EAM server 112 to determine if the user is allowed to access the requested service (Block 718). If not, the network traffic management device 110 will enforce the policy and forward a message to the client device 106 indicating that access to the requested service has been denied (Block 714). However, if the response from the EAM server 112 indicates that the user is allowed to receive the requested service, the network traffic management device 110 will enforce the policy and forward the request to a selected server 102 (Block 720).

Figure 8:
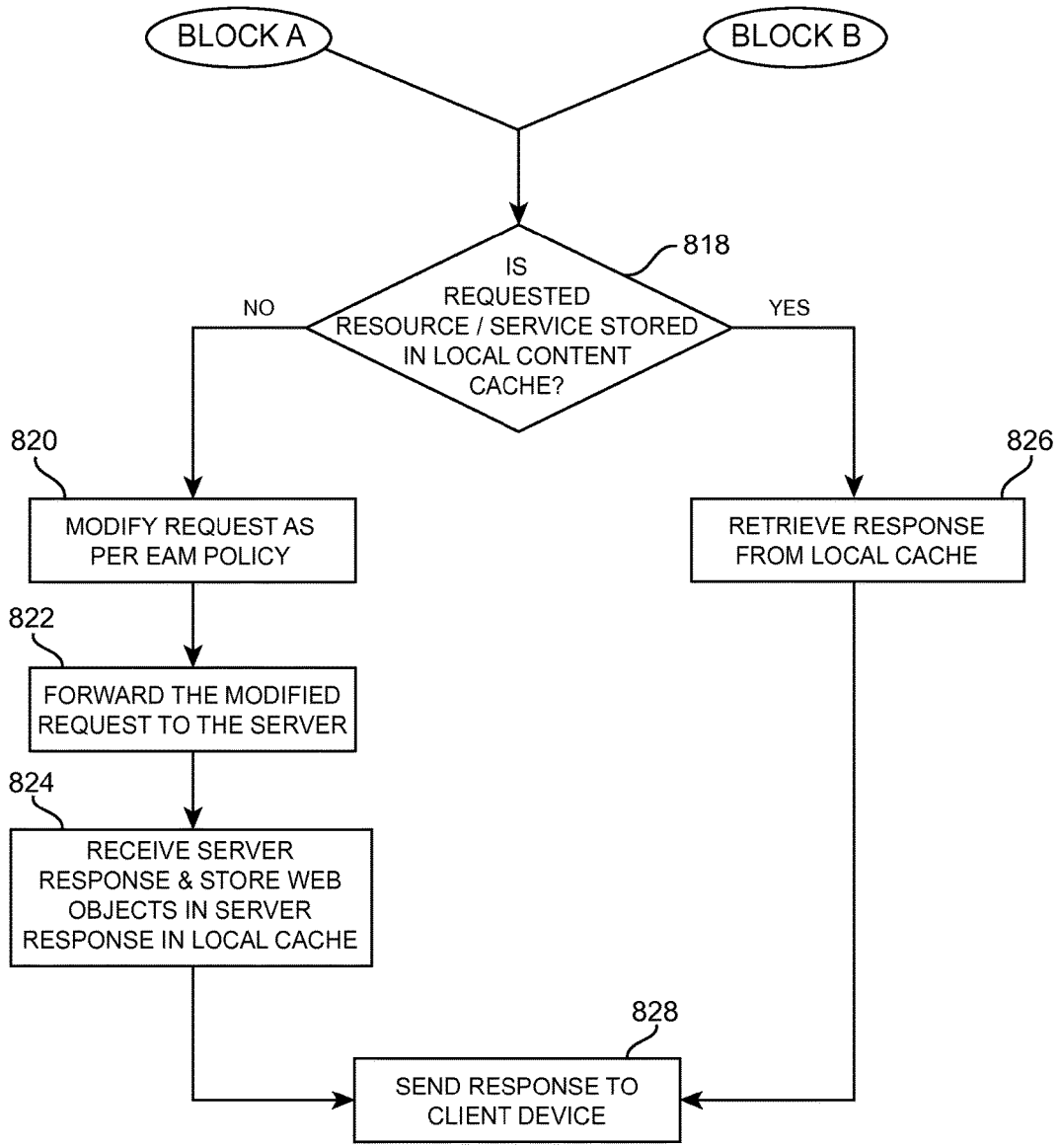
FIG. 8 is an example flow chart diagram depicting additional process steps to the general process disclosed in FIG. 3 or FIG. 7 in accordance with an aspect of the present disclosure.

FIG. 8 is an example flow chart diagram depicting additional process steps to the general process in accordance with an aspect of the present disclosure. It should be noted that the steps discussed in FIG. 8 are optional and are not required to be performed by the network traffic management device 110. As illustrated in FIG. 8, the process proceeds from either Block A (FIG. 3) or Block B (FIG. 7), after the network traffic management device 110 has concluded that the user is authorized to access the requested service/resource from the server 102.

As shown in FIG. 8, prior to forwarding the user's request to the appropriate server 102, the network traffic management device 110 may access a local memory 218 or cache if the requested service was previously accessed by the user and if the response received from the server 102 is available in the cache memory 218 of the network traffic management device 110 (Block 818). In an aspect the cache may also be stored in a file system. This step is applicable when the requested resource contains static web objects that the user is authorized to receive from the server 102. If so, the network traffic management device 110 will retrieve the stored web objects from memory 218 (Block 824). The network traffic management device 110 will then forward a response with the cached web objects back to the client device 106 (Block 828).

In contrast, if the network traffic management device 110 determines that the requested web objects are not stored in the memory 218, the network traffic management device 110 will modify the user's request in accordance with the EAM policy information (Block 820). The network traffic management device 110 will then forward the modified request to the server 102 (Block 822). Once the network traffic management device 110 receives the response from the server 102, the network traffic management device 110 will cache the web objects in the response its local memory 218 (Block 826) before sending the response to the client device 106 (Block 828).

Although not shown, it is contemplated that the network traffic management device 110 may generate and insert a SSO cookie or token into the response received from the server 102, whereby the modified response is sent to the client device 106. The client device 106 will store the SSO token in its internal memory in which subsequent requests will contain the SSO token, as discussed above.

Figure 9:
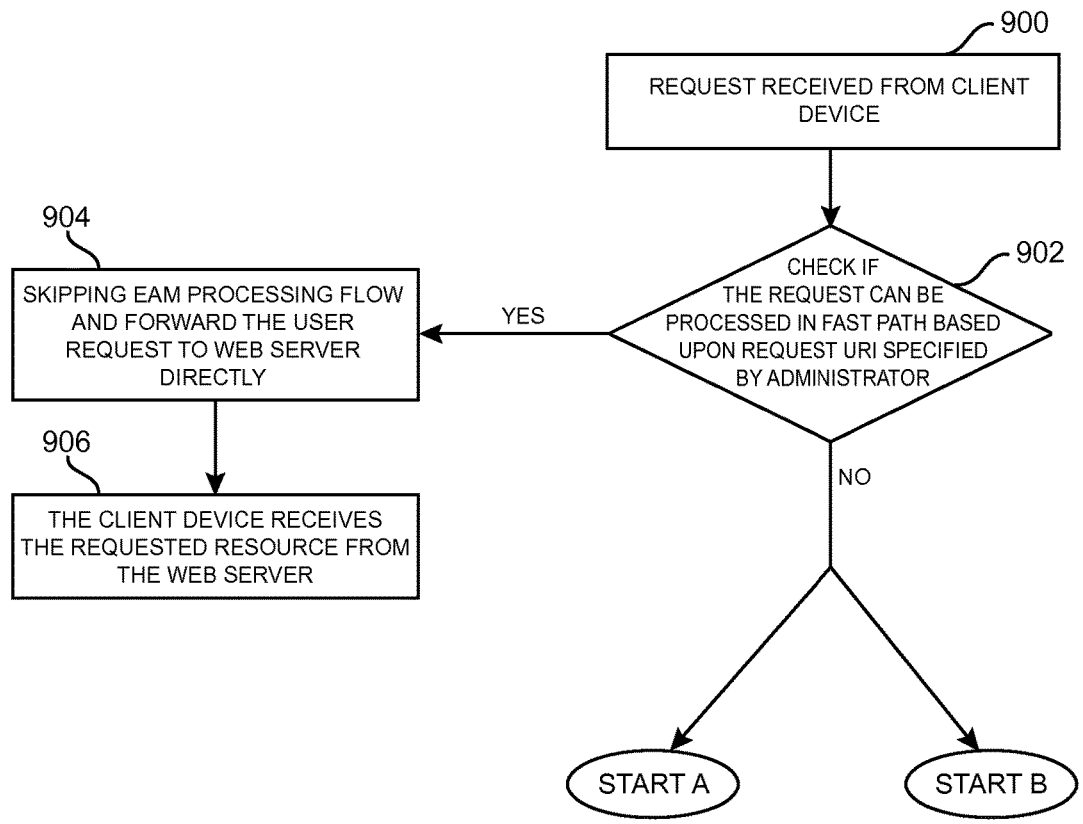
FIG. 9 is an example flow chart diagram depicting a general process in accordance with an aspect of the present disclosure.

FIG. 9 is an example flow chart diagram depicting a general process in accordance with an aspect of the present disclosure. As shown in FIG. 9, upon receiving the user's request via the client device 106 (Block 900), the network traffic management device 110 will determine if the request can be processed in an expedited fast path manner based upon the request's uniform resource identifier (URI) which is specified by a network administrator and stored in the memory 218 (Block 902). If the request can be processed in the fast path manner, the network traffic management device 110 will not communicate with the EAM server 112 and will instead process the request in the fast path manner. The processing may result in forwarding the service request directly to the server 102 (Block 904) or denying the service request. The client device 106 will then receive the requested service from the server 102 (Block 906). In contrast, if the network traffic management device 110 determines that the request cannot be processed in the fast path manner, the network traffic management device 110 will proceed with performing the steps from Start Block A (FIG. 3) or Start Block B (FIG. 7). The processes following Start Block A and Start Block B are not reproduced herein for brevity.

Figure 10:
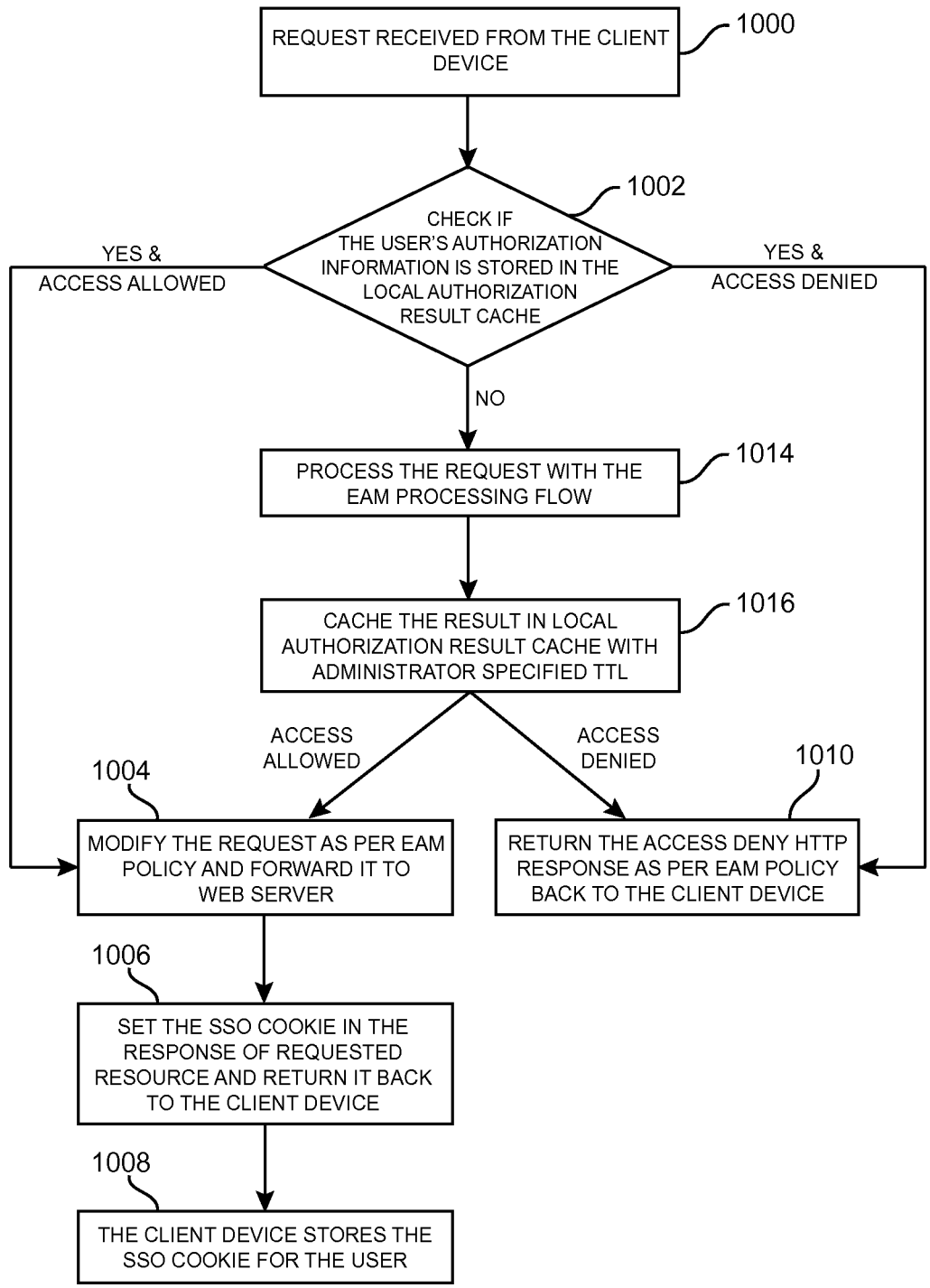
FIG. 10 is an example flow chart diagram depicting a general process in accordance with an aspect of the present disclosure.

FIG. 10 is an example flow chart diagram depicting a general process in accordance with an aspect of the present disclosure. Upon the network traffic management device 110 receiving the service request from the client device 106 (Block 1000), the network traffic management device 110 checks its local memory 218 to determine if the user has issued the identical service request previously and if the result of user's previous attempt is available in the memory 218. In an aspect, the result may include the user's authorization information, various modifications to be applied to user's request and response and other information. (Block 1002). If the network traffic management device 110 is able to retrieve the various authorization information from the local memory 218, the network traffic management device 110 inspects it to determine whether the request was previously accepted or denied (Block 1002).

If the retrieved request was previously not accepted, the network traffic management device 110 will deny the user from receiving the requested service (Block 1010). If the retrieved request was previously accepted, the network traffic management device 110 will modify the request in accordance with access policy parameters provided by the EAM server 112 and forward the modified request to the server 102 (Block 1004). The network traffic management device 110 may also create and insert a SSO token in the response that is sent back to the client device 106 that allows the user to access the requested service without having to again be authenticated (Block 1006). The client device 106 will then store the SSO token in its local memory (Block 1008).

In contrast, if the network traffic management device 110 determines that no previous request is stored in the memory 218, the network traffic management device 110 will proceed with the process described above in FIGS. 3 and/or 7 (Block 1014). Thereafter, the network traffic management device 110 will store the result for that user's service request in the local memory 218 with a specified time-to-live parameter for the stored service request. The time to live parameter allows the network administrator to specify how long the network traffic management gateway can cache the authorization information. The valid values can range from milliseconds to days.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method of providing access control, the method comprising:
   receiving, by a local external access management (EAM) agent of a network traffic management device, a request from a client device for a user to access a service or resource accessible to one or more servers;
   sending, by the EAM agent of the network traffic management device, credential information for the user to an EAM server, wherein the network traffic management device and the local EAM agent are remote from the servers and the EAM server;
   receiving, by the EAM agent of the network traffic management device, access policy information for the user from the EAM server in response to sending the credential information, the access policy information indicating whether the user is authorized to access the service or resource; and enforcing, by the EAM agent of the network traffic management device, the access policy information comprising sending another request on behalf of the client device to access the service or resource accessible to servers based on traffic handling priority information for the user corresponding to identity information included in the access policy information, when the access policy information indicates that the user is authorized to access the service or resource.

2. The method of claim 1, obtaining, by the EAM agent of the network traffic management device, the credential information for the user comprising at least one of receiving the credential information in response to a request for the credential information sent to the client device or retrieving the credential information from a single sign on (SSO) cookie included in the received request to access the service or resource.

3. The method of claim 1, further comprising:
generating by the EAM agent of the network traffic management device, and inserting into a received response from one or more of the servers, a single sign on (SSO) cookie for the user, wherein the SSO cookie contains the credential information and at least a portion of the access policy information for the user received from the EAM server; and
sending, by the EAM agent of the network traffic management device, the response with the inserted SSO cookie to the client device.

4. The method of claim 1, further comprising:
modifying, by the EAM agent of the network traffic management device, the request to include the credential information in accordance with the access policy information; and
sending by the EAM agent of the network traffic management device, the modified request to one or more of the servers.

5. The method of claim 1, further comprising: applying, by the EAM agent of the network traffic management device, a local access policy for the user prior to sending the credential information to the EAM server.

6. The method of claim 1, further comprising:
determining, by the EAM agent of the network traffic management device, when at least a portion of a previous server response to the request is stored in a memory;
retrieving, by the EAM agent of the network traffic management device, the at least a portion of the previous server response from the memory, when the determining indicates that the at least a portion of the previous server response is stored in the memory; and
sending, by the EAM agent of the network traffic management device, the retrieved at least a portion of the previous server response to the client device.

7. The method of claim 1, further comprising:
determining, by the EAM agent of the network traffic management device, when the request can be processed in an expedited manner based on a uniform resource identifier of the request; and
forwarding, by the EAM agent of the network traffic management device, the request directly to one or more of the servers without communicating with the EAM server, when the determining indicates that the request is eligible to be processed in the expedited manner.

8. The method of claim 1, further comprising:
determining, by the EAM agent of the network traffic management device, when a prior determination that the user is authorized to access the service or resource is stored in a memory; and
forwarding, by the EAM agent of the network traffic management device, the request to one or more of the servers, when the determining indicates that the prior determination that the user is authorized to access the service or resource is stored in the memory.

9. The method of claim 1, further comprising: executing, by the EAM agent of the network traffic management device, one or more request processing events, wherein the one or more request processing events are configured to allow insertion of custom processing logic to modify default request processing of the event.

10. A non-transitory machine readable medium having stored thereon instructions for providing access control, comprising machine executable code which when executed by at least one machine, causes the machine to:
receive a request from a client device for a user to access a service or resource accessible to one or more remotely located servers;
send credential information for the user to an external access management (EAM) server;
receive access policy information for the user from the EAM server in response to sending the credential information, the access policy information indicating whether the user is authorized to access the service or resource; and
enforce the access policy information and send another request on behalf of the client device to access the service or resource accessible to the servers based on traffic handling priority information for the user corresponding to identity information included in the access policy information, when the access policy information indicates that the user is authorized to access the service or resource.

11. The machine readable medium of claim 10, wherein the machine executable code when executed by the at least one machine further causes the machine to obtain the credential information for the user comprising at least one of receiving the credential information in response to a request for the credential information sent to the client device or retrieving the credential information from a single sign on (SSO) cookie included in the received request to access the service or resource.

12. The machine readable medium of claim 10, wherein the machine executable code when executed by the at least one machine further causes the machine to:
generate, and insert into a received response from one or more of the servers, a single sign on (SSO) cookie for the user, wherein the SSO cookie contains the credential information and at least a portion of the access policy information for the user received from the EAM server; and
send the response with the inserted SSO cookie to the client device.

13. The machine readable medium of claim 10, wherein the machine executable code when executed by the at least one machine further causes the machine to:
modify the request to include the credential information in accordance with the access policy information; and
send the modified request to one or more of the servers.

14. The machine readable medium of claim 10, wherein the machine executable code when executed by the at least one machine further causes the machine to:
apply a previously stored local access policy for the user prior to sending the credential information to the EAM server.

15. The machine readable medium of claim 10, wherein the machine executable code when executed by the at least one machine further causes the machine to:
- determine when at least a portion of a previous server response to the request is stored in a memory;
- retrieve the at least a portion of the previous server response from the memory when the determining indicates that the at least a portion of the previous server response is stored in the memory; and
- send the retrieved at least a portion of the previous server response to the client device.

16. The machine readable medium of claim 10, wherein the machine executable code when executed by the at least one machine further causes the machine to:
- determine when the request can be processed in an expedited manner based on a uniform resource identifier of the request; and
- forward the request directly to one or more of the servers without communicating with the EAM server, when the determining indicates that the request is eligible to be processed in the expedited manner.

17. The machine readable medium of claim 10, wherein the machine executable code when executed by the at least one machine further causes the machine to:
- determine when a prior determination that the user is authorized to access the service or resource is stored in a memory; and
- forward the request to one or more of the servers, when the determining indicates that the prior determination that the user is authorized to access the service or resource is stored in the memory.

18. The machine readable medium of claim 10, wherein the machine executable code when executed by the at least one machine further causes the machine to execute one or more request processing events, wherein the one or more request processing events are configured to allow insertion of custom processing logic to modify default request processing of the event.

19. A network traffic management device comprising:
- a memory comprising programmed instructions stored in the memory for a local external access management (EAM) agent; and
- a processor coupled to the memory and configured to be capable of executing the programmed instructions stored in the memory to:
  - receive a request from a client device for a user to access a service or resource accessible to one or more servers;
  - send credential information for the user to an EAM server, wherein the network traffic management device and the local EAM agent are remote from the servers and the EAM server;
  - receive access policy information for the user from the EAM server in response to sending the credential information, the access policy information indicating whether the user is authorized to access the service or resource; and
  - enforce the access policy information and;
  - sending another request on behalf of the client device to access the service or resource accessible to the servers based on traffic handling priority information for the user corresponding to identity information included in the access policy information, when the access policy information indicates that the user is authorized to access the service or resource.

20. The network traffic management device of claim 19, wherein the processor is further configured to be capable of executing the programmed instructions stored in the memory to obtain the credential information for the user comprising at least one of receive the credential information in response to a request for the credential information sent to the client device or retrieve the credential information from a single sign on (SSO) cookie included in the received request to access the service or resource.

21. The network traffic management device of claim 19, wherein the processor is further configured to be capable of executing the programmed instructions stored in the memory to:
- generate, and insert into a received response from one or more of the servers, a single sign on (SSO) cookie for the user, wherein the SSO cookie contains the credential information and at least a portion of the access policy information for the user received from the EAM server; and
- send the response with the inserted SSO cookie to the client device.

22. The network traffic management device of claim 19, wherein the processor is further configured to be capable of executing the programmed instructions stored in the memory to:
- modify the request to include the credential information in accordance with the access policy information; and
- send the modified request to one or more of the servers.

23. The network traffic management device of claim 19, wherein the processor is further configured to be capable of executing the programmed instructions stored in the memory to apply a previously stored local access policy for the user prior to sending the credential information to the EAM server.

24. The network traffic management device of claim 19, wherein the processor is further configured to be capable of executing the programmed instructions stored in the memory to:
- determine when at least a portion of a previous server response to the request is stored in the memory;
- retrieve the at least a portion of the previous server response from the memory when the determining indicates that the at least a portion of the previous server response is stored in the memory; and
- send the retrieved at least a portion of the previous server response to the client device.

25. The network traffic management device of claim 19, wherein the processor is further configured to be capable of executing the programmed instructions stored in the memory to:
- determine when the request can be processed in an expedited manner based on a uniform resource identifier of the request; and
- forward the request directly to one or more of the servers without communicating with the EAM server, when the determining indicates that the request is eligible to be processed in the expedited manner.

26. The network traffic management device of claim 19, wherein the processor is further configured to be capable of executing the programmed instructions stored in the memory to:
- determine when a prior determination that the user is authorized to access the service or resource is stored in the memory; and
- forward the request to one or more of the servers, when the determining indicates that the prior determination that the user is authorized to access the service or resource is stored in the memory.

27. The network traffic management device of claim 19, wherein the processor is further configured to be capable of executing the programmed instructions stored in the memory to execute one or more request processing events, wherein the one or more request processing events are configured to allow insertion of custom processing logic to modify default request processing of the event.

28. A method of providing access control, the method comprising:
  intercepting, by a network traffic management device, a request from a client device for a user to access a service or resource accessible by one or more servers;
  sending, by the network traffic management device, credential information for the user to an external access management (EAM) server, wherein the network traffic management device is remote from the servers and the EAM server;
  receiving, by the network traffic management device, access policy information for the user from the EAM server in response to sending the credential information, the access policy information indicating whether the user is authorized to access the requested service or resource; and
  enforcing, by the network traffic management device, the access policy information comprising sending another request on behalf of the client device to access the service or resource to one or more of the servers, when the access policy information indicates that the user is authorized to access the requested service or resource, and including a single sign on (SSO) cookie or token containing at least a portion of the credential information and at least a portion of the access policy information received from the EAM server for the user in a response to the other request on behalf of the client device, which is then returned by the client device in a subsequent request relating to the service or resource accessible by the servers.

29. A non-transitory machine readable medium having stored thereon machine executable code containing instructions for providing access control, which when executed by at least one machine, causes the machine to:
  intercept a request from a client device for a user to access a service or resource accessible by one or more remotely located servers;
  send credential information for the user to an external access management (EAM) server;
  receive access policy information for the user from the EAM server in response to sending the credential information, the access policy information indicating whether the user is authorized to access the requested service or resource; and
  enforce the access policy information comprising sending another request on behalf of the client device to access the service or resource to one or more of the servers, when the access policy information indicates that the user is authorized to access the requested service or resource, and include a single sign on (SSO) cookie or token containing at least a portion of the credential information and at least a portion of the access policy information received from the EAM server for the user in a response to the other request on behalf of the client device, which is then returned by the client device in a subsequent request relating to the service or resource accessible by the servers.

30. A network traffic management device comprising:
  a memory comprising programmed instructions stored thereon for a local external access management (EAM) agent; and
  a processor coupled to the memory and configured to be capable of executing the stored programmed instructions to:
    intercept a request from a client device for a user to access a service or resource accessible by one or more servers;
    send credential information for the user to an EAM server, wherein the network traffic management device is remote from the servers and the EAM server;
    receive access policy information for the user from the EAM server in response to sending the credential information, the access policy information indicating whether the user is authorized to access the requested service or resource; and
    enforce the access policy information comprising sending another request on behalf of the client device to access the service or resource to one or more of the servers, when the access policy information indicates that the user is authorized to access the requested service or resource, and include a single sign on (SSO) cookie or token containing at least a portion of the credential information and at least a portion of the access policy information received from the EAM server for the user in a response to the other request on behalf of the client device, which is then returned by the client device in a subsequent request relating to the service or resource accessible by the servers.

* * * * *